US006759080B2

(12) United States Patent
Thunhorst et al.

(10) Patent No.: US 6,759,080 B2
(45) Date of Patent: Jul. 6, 2004

(54) PROCESS FOR MAKING FOAMS BY PHOTOPOLYMERIZATION OF EMULSIONS

(75) Inventors: Kristin La Velle Thunhorst, Stillwater, MN (US); Mark David Gehlsen, Eagan, MN (US); Robin Edgar Wright, Inver Grove Heights, MN (US); Eric Wayne Nelson, Stillwater, MN (US); Steven Dean Koecher, New Brighton, MN (US); Douglas Gold, Edina, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/208,514

(22) Filed: Jul. 30, 2002

(65) Prior Publication Data

US 2002/0198271 A1 Dec. 26, 2002

Related U.S. Application Data

(62) Division of application No. 09/398,355, filed on Sep. 17, 1999, now Pat. No. 6,573,305.

(51) Int. Cl.[7] .............................. C08J 9/00; C08J 9/23; C08F 2/46

(52) U.S. Cl. .......................... 427/50.5; 521/50; 521/63; 521/64; 521/65; 521/72; 521/82; 521/142; 521/150; 521/149; 521/915; 522/84; 522/113; 522/114; 522/120; 522/121; 522/149; 522/150; 427/243; 427/244; 427/508

(58) Field of Search ................................. 427/243, 244, 427/508; 522/84, 113, 114, 120, 121, 149, 150; 521/50, 50.5, 63, 64, 65, 72, 82, 142, 149, 150, 915

(56) References Cited

U.S. PATENT DOCUMENTS 3,255,127 A 6/1966 Wulf von Bosin
3,256,219 A 6/1966 Will (List continued on next page.)

FOREIGN PATENT DOCUMENTS

CA 1 195 791 A1 10/1985
DE 1 544 690 12/1964

(List continued on next page.)

OTHER PUBLICATIONS

J. M. Williams and D. A. Wrobleski, *Spatial Distribution of the Phases in Water–in–Oil Emulsions. Open and Closed Microcellular Foams from Cross–Linked Polystyrene*, Langmuir, vol. 4, No. 3, 1988, pp. 656–662.
J. M. Williams, *High Internal Phase Water–in–Oil Emulsions: Influence of Surfactants and Cosurfactants on Emulsion Stability and Foam Quality*, Langmuir, vol. 7, No. 7, 1991, pp. 1370–1377.
M. A. Hoisington, J. R. Duke, and P. G. Apen, High Temperature,*Polymeric, Structural Foams from High Internal Phase Emulsion Polymerizations*, Polymer, vol. 38, No. 13, 1997, pp. 3347–3357.
P. G. Apen, J. M. Williams, *Bromine–Containing Polymeric Foams*, J. Cell. Plast. (Nov., 1992), 28(6), pp. 557–570.

*Primary Examiner*—James J. Seidleck
*Assistant Examiner*—Sanza L. McClendon
(74) *Attorney, Agent, or Firm*—Sean J. Edman

(57) ABSTRACT

The invention discloses methods for making foams by photopolymerizing emulsions comprising a reactive phase and a phase immiscible with the reactive phase components. Foams made from water-in-oil emulsions, including high internal phase emulsion are disclosed. Articles and uses for the foams are also described.

25 Claims, 13 Drawing Sheets

U.S. PATENT DOCUMENTS

| | | | |
|---|---|---|---|
| RE27,444 E | | 7/1972 | Will |
| 3,734,867 A | | 5/1973 | Will |
| 3,988,508 A | | 10/1976 | Lissant |
| 4,038,350 A | | 7/1977 | Jaques |
| 4,142,956 A | | 3/1979 | Shikinami et al. |
| 4,522,953 A | | 6/1985 | Barby et al. |
| 4,767,793 A | | 8/1988 | Schisler et al. |
| 4,771,078 A | | 9/1988 | Schisler et al. |
| 5,006,187 A | | 4/1991 | Cook et al. |
| 5,037,859 A | | 8/1991 | Williams, Jr. et al. |
| 5,149,720 A | | 9/1992 | DesMarais et al. |
| 5,198,472 A | | 3/1993 | DesMarais et al. |
| 5,260,345 A | | 11/1993 | DesMarais et al. |
| 5,262,444 A | | 11/1993 | Rusincovitch et al. |
| 5,290,820 A | | 3/1994 | Brownscombe et al. |
| 5,352,711 A | | 10/1994 | DesMarais |
| 5,358,974 A | * | 10/1994 | Brownscombe et al. ...... 521/64 |
| 5,362,762 A | * | 11/1994 | Beshouri ................ 521/64 |
| 5,387,207 A | | 2/1995 | Dyer et al. |
| 5,545,676 A | | 8/1996 | Palazzotto et al. |
| 5,563,179 A | | 10/1996 | Stone et al. |
| 5,646,193 A | | 7/1997 | Brownscombe et al. |
| 5,670,101 A | * | 9/1997 | Nathoo et al. ............ 264/45.8 |
| 5,691,846 A | | 11/1997 | Benson, Jr. et al. |
| 5,753,360 A | * | 5/1998 | Jones et al. .............. 428/323 |
| 5,856,366 A | | 1/1999 | Shiveley et al. |
| 5,869,220 A | * | 2/1999 | Hallock et al. .......... 430/281.1 |
| 6,015,609 A | | 1/2000 | Chaouk et al. |
| 6,103,645 A | * | 8/2000 | Chang et al. ............. 442/173 |
| 6,245,697 B1 | * | 6/2001 | Conrad et al. ............ 442/370 |
| 6,274,638 B1 | * | 8/2001 | Yonemura et al. ........... 521/64 |
| 6,290,853 B1 | | 9/2001 | Allmer et al. |
| 6,299,808 B1 | * | 10/2001 | Mork et al. ............... 264/46.1 |
| 6,323,250 B1 | * | 11/2001 | Kadonaga et al. ........... 521/64 |
| 6,353,037 B1 | * | 3/2002 | Thunhorst et al. ........... 521/64 |
| 6,376,565 B1 | * | 4/2002 | Dyer et al. ................. 521/64 |
| 6,395,792 B1 | * | 5/2002 | Nagasuna et al. ............ 521/64 |
| 6,395,793 B1 | * | 5/2002 | Kadonaga et al. ........... 521/64 |
| 6,462,100 B1 | * | 10/2002 | Thunhorst et al. ........... 521/53 |

FOREIGN PATENT DOCUMENTS

| | | |
|---|---|---|
| EP | 0 000 933 B1 | 8/1978 |
| EP | 0 068 830 A1 | 1/1983 |
| EP | 0 216 622 A | 4/1987 |
| EP | 0 430 517 A | 6/1991 |
| GB | 1 428 125 | 3/1976 |
| GB | 1 458 203 | 12/1976 |
| GB | 1 493 356 | 11/1977 |
| JP | 51-111279 | 10/1976 |
| JP | 51-111280 | 10/1976 |
| JP | 57-063334 A2 | 4/1982 |
| JP | 58-038786 A1 | 3/1983 |
| JP | 58-087134 A2 | 5/1983 |
| JP | 03-267172 | 11/1991 |
| JP | 03-275177 | 12/1991 |
| JP | 04148978 | 5/1992 |
| JP | 07 335053 | 12/1995 |
| JP | 10-139945 | 11/1996 |
| WO | WO 96/21680 | 7/1996 |
| WO | WO 96/21682 | 7/1996 |
| WO | WO 96/40528 | 12/1996 |
| WO | WO 97/19347 * | 5/1997 |
| WO | WO 97/31600 | 9/1997 |
| WO | WO 97/32612 | 9/1997 |

* cited by examiner

PROCESS FOR MAKING FOAMS BY PHOTOPOLYMERIZATION OF EMULSIONS

CROSS-REFERENCE TO RELATED APPLICATIONS

This application is a divisional of U.S. Ser. No. 09/398,355, filed Sep. 17, 1999 now U.S. Pat. No. 6,573,305, the disclosure of which is herein incorporated by reference.

TECHNICAL FIELD

This invention relates to foams made by photopolymerizing emulsions. The emulsions comprise a reactive phase and an immiscible phase wherein the reactive phase or both phases are continuous. The resulting foams may be closed or open cell, depending on the initial emulsion microstructure.

BACKGROUND

In the past, thermal polymerization has been used as a technique to polymerize high internal phase emulsions (HIPE)s. Typically these HIPEs contain styrene and divinylbenzene as well as other monomers. The thermal polymerization technique is very time intensive, usually requiring more than 10 hours for polymerization, and prohibits continuous production of foams. For thermal polymerization, emulsions are made and poured into a sealed container in which they are heated for many hours. After polymerization, the solid foams (still containing water) are removed and dried in an oven.

The emulsions used in thermal polymerization must remain stable for many hours until the polymerization process is complete, otherwise inhomogeneous foam materials would be formed. The requirement for a stable emulsion limits the types of monomers and surfactants that may be used in a thermal polymerization process.

SUMMARY OF INVENTION

The present invention features a novel method for creating foams, including open cell foams, from water-in-oil emulsions. The applicants found, surprisingly, that they could make foams from high internal phase emulsions (HIPEs) and other water-in-oil emulsions using a photopolymerization process. This is unexpected because emulsions typically have an opaque appearance and would not be expected to transmit enough light to conduct a photopolymerization reaction. Applicants found that they could cure an emulsion as thick as 8 millimeters.

The foams may be made by a batch process, or a continuous process in which the emulsion may be coated on a moving support. In either case, the foam is polymerized and crosslinked by exposure to actinic radiation. Some embodiments of the foams may be polymerized and crosslinked within one second or less of radiation illumination time. The fast polymerization process of the present invention allows a broad range of materials to be used because the emulsion needs to be stable for only a short time (seconds to minutes).

One aspect of the present invention provides a process for making a crosslinked polymeric foam comprising: a) mixing a reactive phase comprising at least one polymerizable material, at least one crosslinking agent, and at least one emulsifier with at least one photoinitiator and a liquid fluid immiscible with the reactive phase to form an emulsion wherein the immiscible fluid forms a discontinuous or co-continuous phase with the continuous reactive phase; b) shaping the emulsion; and c) exposing the emulsion to actinic radiation to form a crosslinked polymeric foam containing residual immiscible fluid.

The process may comprise further steps of exposing the emulsion to heat and/or removing residual immiscible fluid from the foam.

The polymerizable material may be ethylenically- or acetylenically-unsaturated, such as an acrylate, and free-radically or cationically-curable. The polymerizable material may be the same as the crosslinking agent or the emulsifier.

The immiscible phase is typically water, but may comprise other liquids such as fluorocarbons or organic liquids. The immiscible fluid may comprise 74 volume percent, or more, of the emulsion.

The reactive phase may include, e.g., non-polymerizable materials and materials that can incorporate functional groups into the foam.

The structure of the foam of the present invention may be controlled by aging the emulsion prior to polymerization or by selection of a particular agitation method for making the emulsion.

The emulsion may include photoinitiators in the reactive or immiscible phase. Preferably, the photoinitiators are activated by ultraviolet or visible radiation of 300 to 800 nanometers.

Polymerization and crosslinking of the emulsion may occur in as little as 10 minutes or even 10 seconds.

A further aspect of the invention is an emulsion having a continuous reactive phase comprising at least one polymerizable material and at least one crosslinking agent, a discontinuous or co-continuous phase comprising a liquid fluid immiscible with the reactive phase, and at least one photoinitiator.

A further aspect of the invention is an open cell crosslinked foam comprising no thermal initiator residue. Another aspect of the invention is an open cell cross-linked foam comprising residue of a photoinitiator that absorbs at a wavelength of 300 to 800 nanometers.

A further aspect of the invention is a closed cell crosslinked foam comprising no thermal initiator residue. Another aspect of the invention is a closed cell cross-linked foam comprising residue of a photoinitiator that absorbs at a wavelength of 300 to 800 nanometers.

The foams may be crosslinked within the voids of a material selected from the group consisting of polymeric, woven, nonwoven, and metals. Alternatively, the foam may contain non-polymerizable materials selected from the group consisting of polymers, metals, particles, and fibers.

Some foams of the present invention can absorb at least two and one-half times their weight in fluid. Some of the foams collapse when fluid is removed.

Another aspect of the present invention is articles made using the foams of the present invention.

Foams of the present invention made from HIPEs have relatively homogeneous structures and may possess cell sizes between 1 and 200 microns and densities of at least 0.01 g/cc. Cells are typically joined by open "windows" or holes connecting adjacent cells. Some of the resulting foam materials may be capable of absorbing 25 or more times, typically 4 to 16 times, their weight in fluid (water or organic fluids). Some of the foams are extremely porous, having Gurley values (at 50 cc of air) of 2 to 70 seconds for a 0.2 cm (80 mil) thick specimen.

Foams of the present invention made from non-HIPE emulsions typically have interconnecting channel structures rather than a well-defined cellular structure.

Closed cell foams may also be made using the photopolymerization process of the present invention.

As used in this invention:

"HIPE" or "high internal phase emulsion" means an emulsion comprising a continuous reactive phase, typically an oil phase, and a discontinuous or co-continuous phase immiscible with the oil phase, typically a water phase, wherein the immiscible phase comprises at least 74 volume percent of the the emulsion;

"water-in-oil emulsion" means an emulsion containing a continuous oil phase and a discontinuous water phase; the oil and water phases may be co-continuous in some cases;

"reactive phase" means the continuous phase which contains the monomer or reactive species that are sensitive to reactive propagating species (e.g., those having free radical or cationic centers) and can be polymerized or crosslinked;

"immiscible phase" means a phase in which the reactive components have limited solubility; the immiscible phase may be discontinuous, or co-continuous with the reactive phase;

"stable" means the composition and microstructure of the emulsion is not changing over time;

"functional group" means a chemical entity capable of undergoing a non-polymerization reaction;

"monomer" means chemical species capable of polymerizing, it includes monomers and oligomers;

"reactive surfactant" means a surfactant (i.e., emulsifier) having sufficient reactivity to undergo polymerization reactions such that it becomes part of a polymer backbone;

"open cell" means a foam wherein the majority of adjoining cells are in open communication with each other; an open cell foam includes foams made from co-continuous emulsions in which the cell structure is not clearly defined, but there are interconnected channels creating at least one open pathway through the foam;

"window" means an intercellular opening;

"shaping" means forming into a shape and includes pouring, coating, and dispensing;

"polymerize" or "cure" are used interchangeably in this application and indicate a chemical reaction in which monomers, oligomers, or polymers combine, including by crosslinking, to form a chain or network;

"crosslinking" means the formation of chemical links between polymer chains;

"crosslinking agent" means a material that adds to a polymer chain a site capable of forming a link to another polymer chain;

"cationically curable monomer" means a monomer capable of undergoing polymerization in which cationic species propagate the polymerization reaction and includes monomers containing, e.g., epoxide or vinyl ether moieties;

"ethylenically unsaturated" means a monomer having a carbon—carbon double bond in its molecular structure;

"acetylenically unsaturated" means a monomer having a carbon—carbon triple bond in its molecular structure;

"actinic radiation" means photochemically active radiation including near infrared radiation, visible light, and ultraviolet light;

"UV" or "ultraviolet" means actinic radiation having a spectral output between about 200 and about 400 nanometers;

"visible light" means actinic radiation having a spectral output between about 400 to about 800 nanometers;

"near infrared" means actinic radiation having a spectral output between about 800 to about 1200 nanometers;

"photoinitiator" means a chemical added to selectively absorb actinic radiation and generate reactive centers such as free radicals and cationic species;

"thermal initiator" means a species only capable of efficiently inducing or causing polymerization or crosslinking by being exposed to heat;

"homogeneous composition" means having a uniform distribution of chemical components when examined on a scale of 0.5 micrometers;

"pressure sensitive adhesive" or "PSA" means an adhesive that will adhere to a variety of dissimilar surfaces upon mere contact without the need of more than finger or hand pressure; PSAs are sufficiently cohesive and elastic in nature so that, despite their aggressive tackiness, they can be handled with the fingers and removed from smooth surfaces with little or no residue left behind; PSAs can be quantitatively described using the "Dahlquist criteria" which maintains that the elastic modulus of these materials is less than $10^6$ dynes/cm$^2$ at room temperature. See Pocius, A. V., Adhesion & Adhesives: An Introduction, Hanser Publishers, New York, N.Y., First Edition, 1997, and "void" means any open space, in a foam, such as holes, cells, and interstices.

An advantage of at least one embodiment of the present invention is that the photopolymerization process may be completed in seconds as opposed to thermal polymerization methods that typically require many hours.

An advantage of at least one embodiment of the present invention is that the faster polymerization process allows the use of emulsion compositions that cannot remain stable for the length of time required to complete thermal polymerization.

An advantage of at least one embodiment of the present invention is that a broad spectrum of foam physical properties can be generated by manipulating the type of monomers and co-monomers, the monomer to co-monomer ratio, cell size, percentage of open cells, density of the foam, and mixing methods.

An advantage of at least one embodiment of the present invention is that the process allows continuous foam production as opposed to the batch processing generally required with thermal polymerization of water-in-oil emulsions.

An advantage of at least one embodiment of the present invention is that salts in the water phase of the emulsion are not necessary to provide lengthy stability during emulsification and polymerization. This also eliminates the need to wash away excess salts after polymerization.

An advantage of at least one embodiment of the present invention is that thin foam articles can be produced directly by the present method as opposed to having to cut thin articles from the products of a batch thermal polymerization process.

An advantage of at least one embodiment of the present invention is that the foams may be hydrophilic when produced, depending on monomer and surfactant choice. This eliminates having to incorporate hydrophilizing agents or treat the foam surfaces to make them hydrophilic (e.g., when used as an absorbent) as is required with some thermally polymerized foams.

An advantage of at least one embodiment of the present invention is that foams having a wide range of cell and window sizes can be obtained because the method of the present invention allows foams to be made from emulsions that are stable for as little as one minute or less.

An advantage of at least one embodiment of the present invention is that the foam materials are suitable for a myriad of applications such as energy and fluid absorption, insulation, and filtration. An advantage of at least one embodiment of the present invention is that multilayer articles comprising one or more foam layers may be made.

An advantage of at least one embodiment of the present invention is that articles comprising regions, i.e., areas, having foams that differ in composition or density may be made.

An advantage of at least one embodiment of the present invention is that the foams may be made by a continuous process.

Other features and advantages of the invention will be apparent from the following drawings, detailed description, and claims.

DETAILED DESCRIPTION

Figure 1:
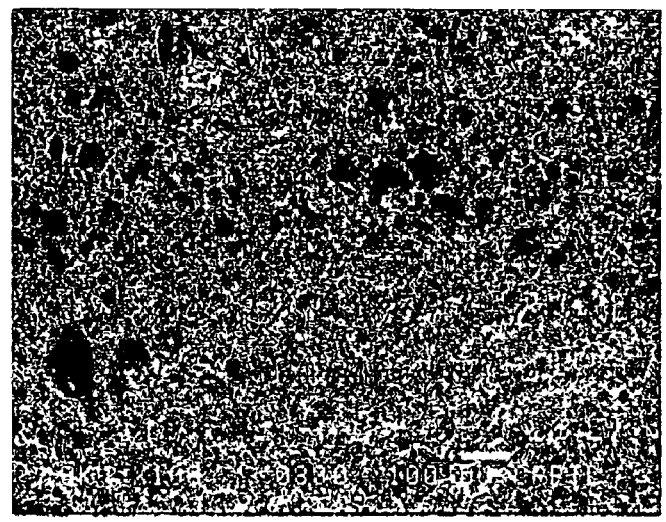
FIG. 1 shows scanning electron microscope (SEM) digital image micrographs of a cross section of an open-cell foam of the present invention at magnifications of 100×, 300×, and 1,000×, respectively, from top to bottom.
Figure 1:
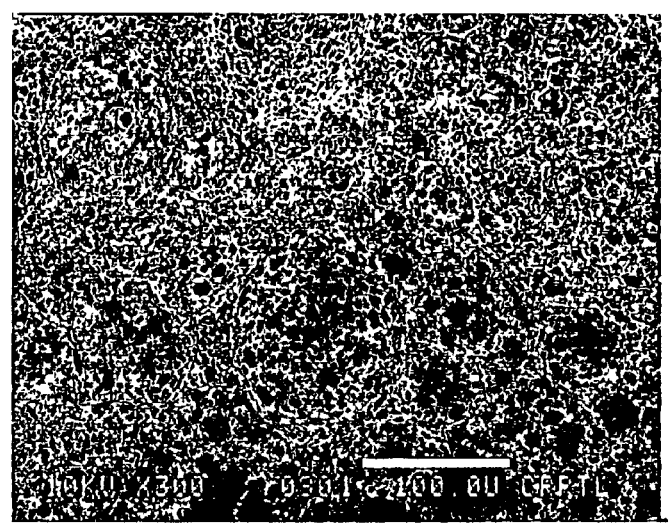
Figure 1:
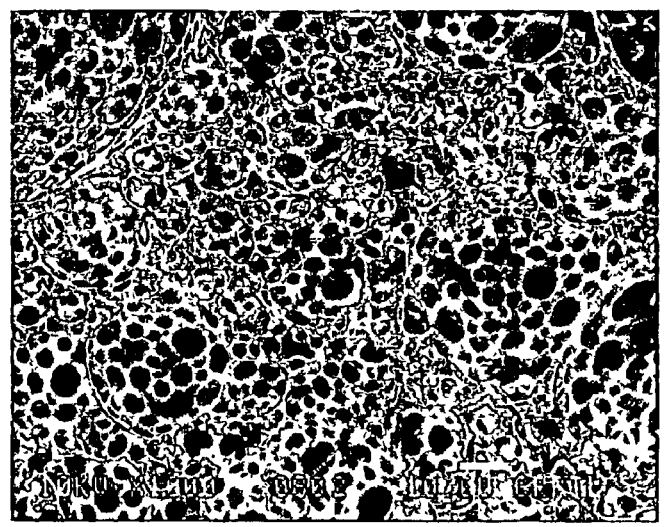

Polymeric foams of the present invention may be made by photopolymerizing HIPES (emulsions having relatively high reactive-to-immiscible phase volume/ratios of approximately 3:1 to 15:1 or greater). Although water is typically used as the immiscible phase, any fluid that is a liquid at operating conditions and is substantially immiscible with the oil (reactive) phase components could be used. Having a non-aqueous immiscible phase allows the use of water-soluble (not merely hydrophilic), as well as ethylenically unsaturated, or acetylenically unsaturated reactants in the reactive phase. (In the present invention, acetylenically unsaturated reactants may be used in any case where ethylenically unsaturated reactants may be used.) Additionally, a nonaqueous immiscible phase can enable water-sensitive polymerization methods, such as cationic polymerization.

For cationic polymerizations, it is often useful to illuminate the emulsion with UV or visible light (starting the photopolymerization by activating a catalyst) and follow this activation step with some heating. The propagating species in cationic polymerizations are much longer-lived than those in free radical polymerizations, and can continue to propagate without illumination (i.e., during the heating step). The reactive species in free radical polymerizations are typically much shorter lived and do not continue to propagate once the light source is removed. The benefit of conducting a post heating step on foams made from cationically polymerizing materials is that the reactivity of the materials (e.g. epoxies) is supplemented by heating. Additionally, greater temperature will provide greater diffusion in a polymerizing system, leading to increased levels of monomer conversion. Enhancements in physical properties are usually produced by post-heating cationically polymerizing systems that were first activated through photopolymerization. These effects can also be produced by maintaining elevated temperatures during the photopolymerization process, but not conducting a separate post-heating step at the end. In fact, free radical polymerizations can also be driven to higher levels of conversion if they are maintained at elevated temperatures during the photopolymerization step. In the current invention, however, some of the emulsion compositions (containing free radically polymerizable materials) are unstable at elevated temperatures, and in these cases it is undesirable to deliberately increase the temperature of the emulsion system before or during the photopolymerization.

Emulsions having co-continuous reactive and immiscible phases, may also be used to make foams of the present invention, e.g., a water-in-oil emulsion with a water to oil ratio of less than 3:1.

The emulsions of the present invention contain a photo-initiating specie(s). The photoinitiating specie(s) may be present in either phase. The emulsions do not require a thermal initiating species. Thermal initiators include, e.g., azo compounds, peroxides, peroxy carbonates, peroxycarboxylates, potassium persulfate, t-butyl peroxyisobutyrate, and 2,2'-azobisisobutyronitrile.

After the emulsions are formed, they may be polymerized and crosslinked by exposure to actinic radiation, e.g., ultra-violet and visible radiation. Removal of the immiscible phase will typically leave an open cell foam structure. Closed cell foams may also be made according to the present invention.

The relative amounts of immiscible and reactive phase components used to form the emulsions of the present invention, among many other parameters, is important in determining the structural, mechanical, and performance properties of the resulting polymeric foams. The immiscible to reactive phase volume ratio can influence foam characteristics such as density, cell size, cell structure, and dimensions of struts that form the foam structure. The density and microstructure of the foam also depend on aspects of the emulsion-making process (rate of immiscible phase addition to the reactive phase, agitation method, etc.).

The emulsions of the present invention can be photopolymerized rapidly. They may be polymerized in less than one hour, preferably less than 10 minutes, more preferably less than 30 seconds, still more preferably less than 10 seconds, and most preferably less than 1 second. This rapid polymerization allows a wider variety of compositions to be used, compared to those suitable for thermal polymerization techniques. This is partly due to emulsion stability requirements. Because photopolymerization can occur quickly with the method of the present invention, the emulsion need only be stable for a short period of time, e.g., up to several minutes, as compared to hours of stability required for thermal polymerization.

The emulsions may also be applied onto or into materials before polymerization so that the reactive phase of the emulsion polymerizes in and around the material, thus incorporating the material into the foam structure. The incorporated materials can provide the foam with strength and other desirable properties. Suitable materials include porous or open-weave materials such as woven, nonwoven, fibrous, and particulate materials, including scrims. The foams may also be coated, and polymerized, on nonporous materials such as paper, polymer, metal materials, and microstructured substrates.

Light in the visible and/or ultra-violet range (200 to about 800 nm) is preferably used to polymerize the emulsions of the present invention. Due to the high tendency of emulsions to scatter light, it is preferable to use long wavelengths in this range because they are better able to penetrate the emulsions. Preferable wavelengths are 200 to 800 nanometers, more preferably 300 to 800 nanometers, most preferably 300 to 450 nanometers because of the availability of photoinitiators activated at these wavelengths and availability of light sources. The photoinitiators used should be able to absorb at the wavelength(s) of the light source used. Because the process of the present invention does not require thermal polymerization, the emulsions, and resulting foams, need not contain any thermal initiator or thermal initiator residue.

After the foam has been polymerized, the immiscible phase fluid will typically still be present in the foam. This residual immiscible fluid may be removed by drying the foam structure. Suitable drying methods include, e.g., vacuum drying, freeze drying, squeeze drying, microwave drying, drying in a thermal oven, drying with infrared lights, or a combination of these techniques.

The emulsions are typically prepared under low shear conditions, i.e., methods providing gentle mixing of the continuous and dispersed phases, such as shaking, using an impeller mixer or pin mixer, and using a magnetic stir bar. High shear conditions may be achieved with, a rotor stator mixer, a homogenizer, or a microfluidizer. Properties of foams of the present invention such as cell sizes, cell size distributions, and number of windows may be influenced by the agitation methods or agitation speeds used to make the emulsions. Cell sizes will also depend on factors such as the type of monomer(s) and surfactant(s) used, and the volume ratio of immiscible phase to reactive phase.

Emulsions of the present invention may be made by continuous or batch processes. Suitable apparatus for making the emulsions continuously include static mixers, rotor stator mixers, and pin mixers. Greater agitation may be achieved by increasing the speed of agitation or using apparatus designed to disperse the emulsifier more finely in the emulsion during the mixing process. Batch process emulsions may be made by mixing or shaking the combined ingredients, by hand or by machine. Greater agitation in a batch process may be achieved, by using e.g., a driven impeller mixer or a three-propeller mixing blade.

The foam microstructure can also be influenced by the amount of time elapsed between preparation of the emulsion and polymerization. Typically, as more time elapses, the emulsion begins to break down, i.e., cells coalesce and/or cell walls collapse. A foam made from an aged emulsion may have larger and fewer cells than a foam made from the same emulsion but polymerized soon after the emulsion is made. Aging the emulsion can also affect the size, number, and location of the interconnecting windows, which can alter the fluid uptake behavior of the resulting foam.

Adding a salt to the immiscible phase can change the cell window structures because it forces the lipophilic monomer out of the immiscible phase and into the reactive (oil) phase thereby improving emulsion stability. i.e., the emulsion resists breaking down into distinct layers of reactive and immiscible phases. Salts are not needed in the present invention, but may be used.

Figure 7:
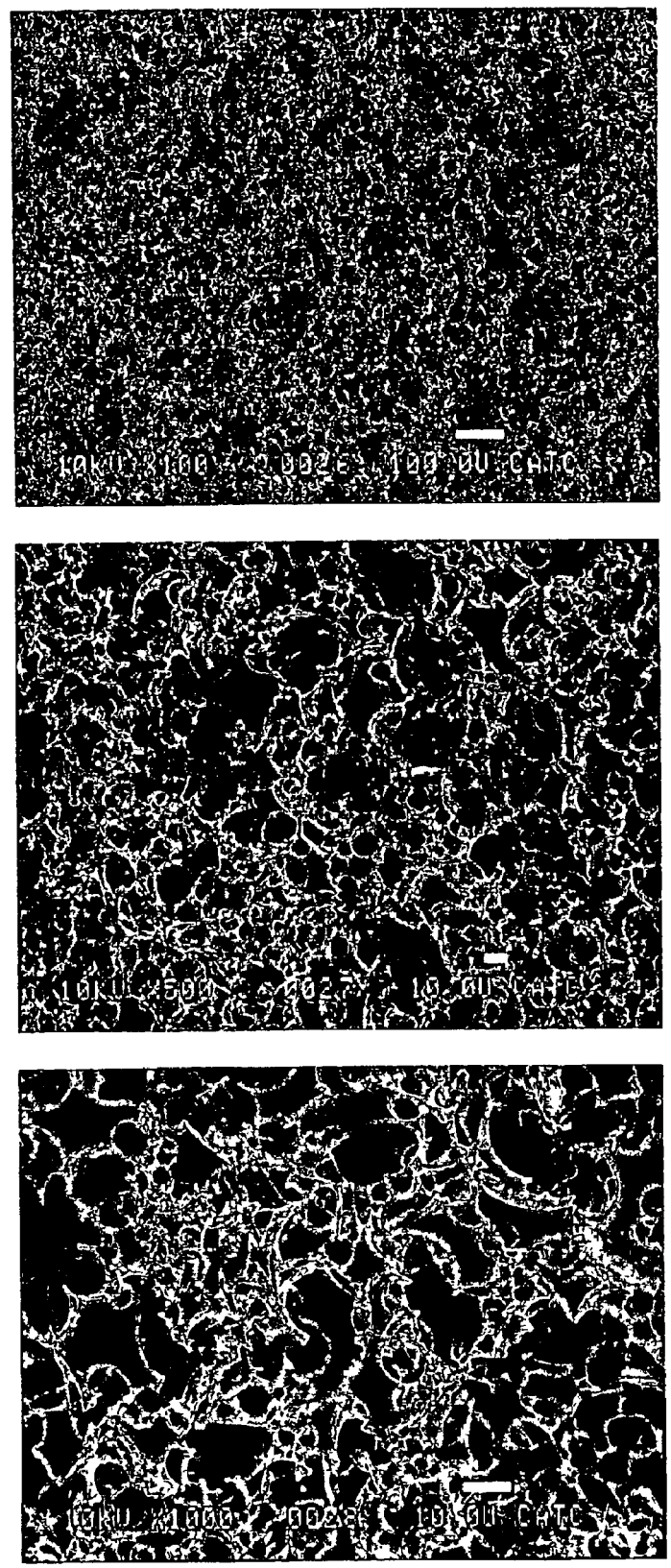
FIG. 7 shows SEM digital image micrographs of a cross section of an open-cell foam of the present invention made by a process comprising continuous emulsion-making. Magnifications of the foam, from top to bottom, respectively, are 100×, 500×, and 1,000×.
Figure 9:
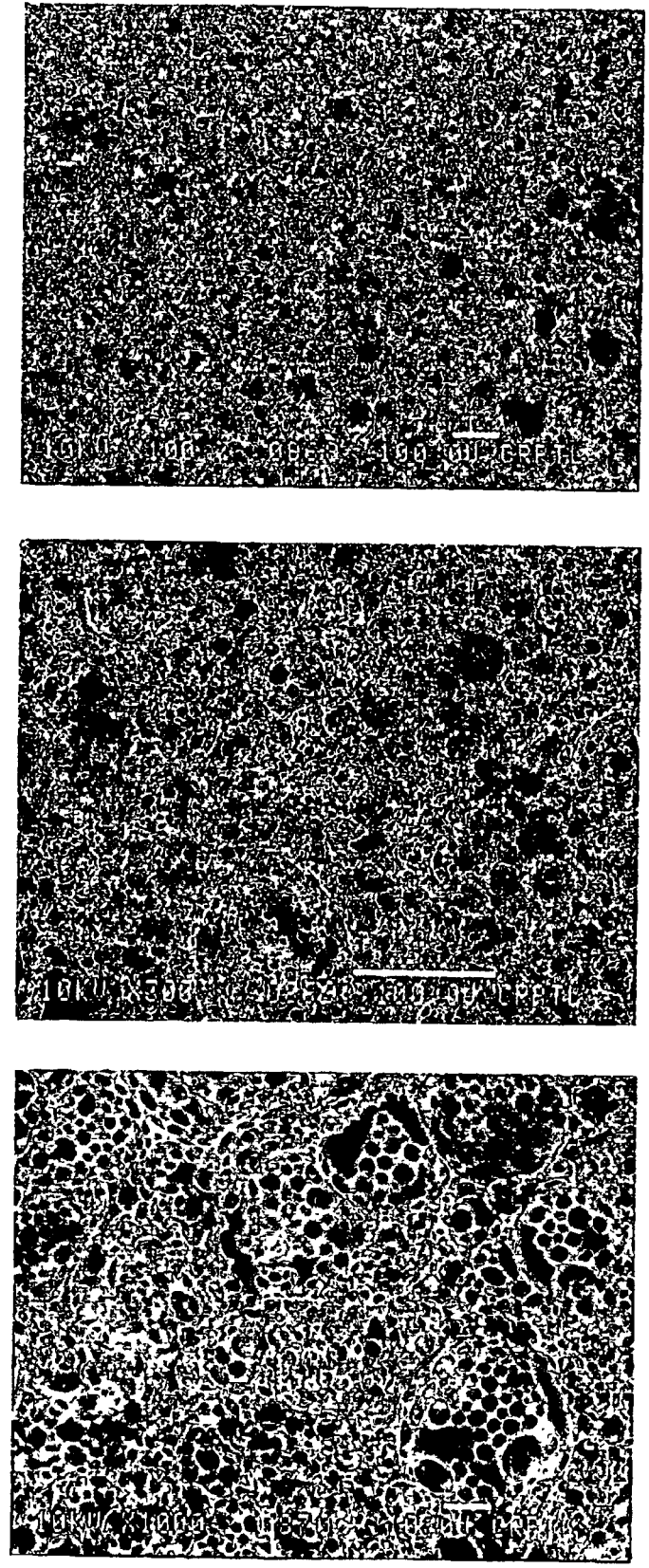
FIG. 9 shows SEM digital image micrographs of a cross section of a foam of the present invention made with a rotor-stator mixer. Magnifications of the foam, from top to bottom, respectively, are 100×, 300×, and 1,000×.
Figure 10:
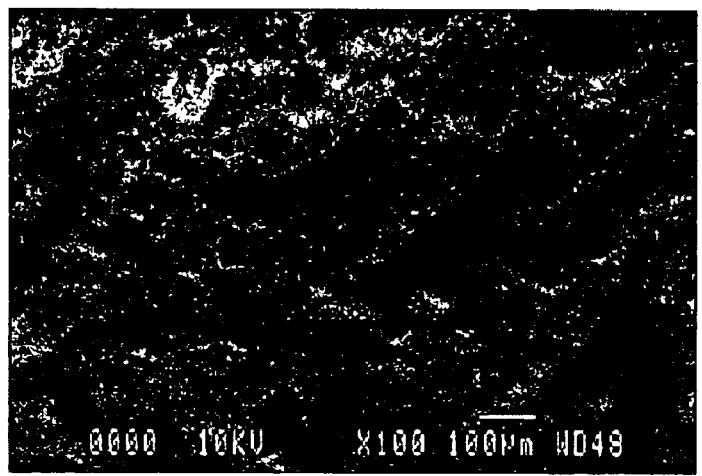
FIG. 10 shows SEM digital image micrographs of a cross section of a foam of the present invention made with a pin mixer. Magnifications of the foam, from top to bottom, respectively, are 100×, 500×, and 1,000×.
Figure 10:
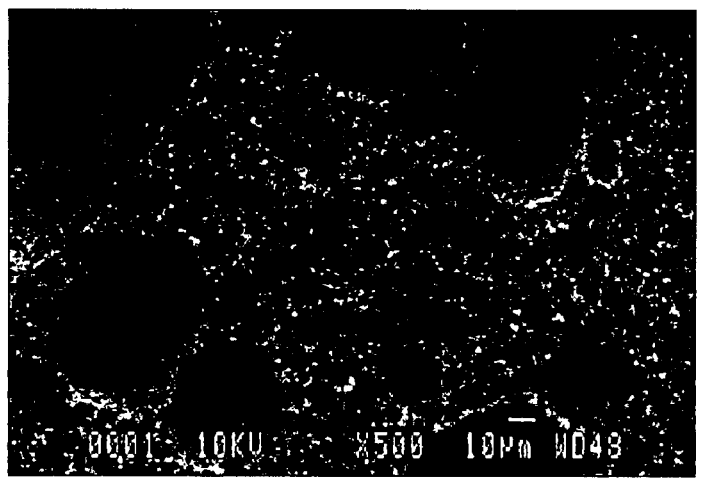
Figure 10:
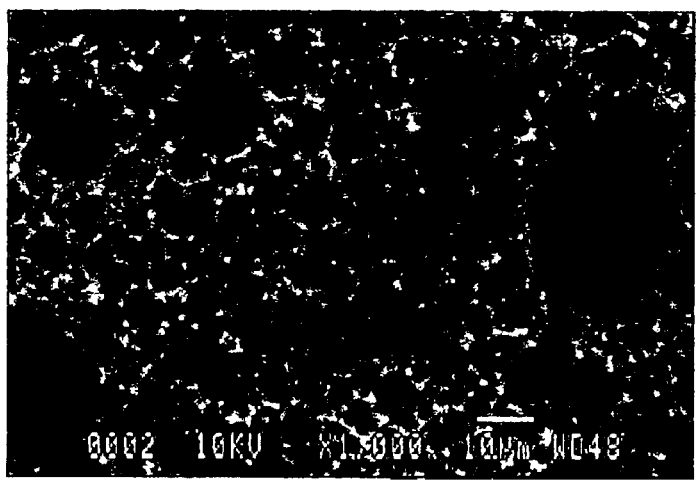

As mentioned above, a variety of mixing techniques can be used to make the emulsions of the present invention. For a given reactive-to-immiscible phase ratio, each of these mixing techniques has the potential to produce a slightly different emulsion microstructure. High shear and low shear mixing conditions can both be used. If the components of the reactive or immiscible phases have high viscosities, low shear conditions may not produce a foam. High shear conditions may produce foams having relatively higher densities because using high shear conditions usually results in less incorporation of the immiscible phase into the reactive phase as compared to using low shear. The extent of the microstructure variability is evident in the following figures (FIG. 9 shows a foam made with a continuous rotor-stator mixer, FIG. 7 (Example 27) shows a foam made with a static mixer, and FIG. 10 shows a foam made with a pin mixer). The desired microstructure will depend on the specific foam application of interest. The various microstructures will provide different properties in terms of pressure drop, fluid flow, tortuosity of the fluid path, surface area, etc. The ability to make many different microstructures with the same starting materials makes this process of the current invention a particularly versatile one.

Many polymeric foams of the present invention made from HIPEs are typically relatively open-celled. This means that most or all of the cells are in unobstructed communication with adjoining cells although closed cell foams may also be made. The cells in such substantially open-celled foam structures have intercellular windows that are typically large enough to permit fluid transfer from one cell to another within the foam structure.

The substantially open-celled foam structures will generally have a reticulated character with the individual cells being defined by a plurality of mutually connected, three-dimensionally branched webs. The strands of polymeric material making up these branched webs can be referred to as struts. The struts typically form a dimensionally long-range macroscopic structure, in contrast to a loosely associated network of particles.

Closed cell foams may also be made by the process of the present invention. Whether foam cells are open or closed will largely depend on the amount of surfactant in the emulsion. This phenomenon, and the appropriate surfactant content needed to obtain a closed-cell foam, are described, for example, in Williams, J. M. and Wrobleski, D. A., *Spatial Distribution of the Phases in Water-in-Oil Emulsions. Open and Closed Microcellular Foams from Cross-Linked Polystyrene, Langmuir* Vol. 4, No. 3, 1988, 656–662.

The HIPE foams of the present invention preferably have densities of greater than 0.005 g/cc more preferably greater than 0.01 g/cc, and typically have densities of less than 0.25 g/cc. Foam cells, and especially cells formed by polymerizing a monomer-containing reactive phase that surrounds a relatively monomer-free immiscible phase droplet, tend to be substantially spherical in shape. Cell sizes typically range from 1 to 200 micrometers and are preferably less than 100, more preferably less than 50, most preferably less than 20 micrometers, for most applications. The HIPE foams typically have 4 to 100 intercellular windows, preferably 2 or more, more preferably 8 or more. The windows preferably having diameters of 0.1 to 25 $\mu$m, preferably 0.1 to 10 $\mu$m. The non-HIPE foams of the present invention typically have an interconnected channel structure. They preferably have densities of greater than 0.20 g/cc, and typically have densities of 0.25 to 0.98 g/cc.

The foam densities listed here assume oil phase components having a density of approximately 1 g/cc. If denser materials are used in the reactive phase the foam density can be greater than those listed as ranges herein.

Foam materials of the present invention having two major parallel surfaces may be from 0.05 to 10 millimeters thick, preferably 8 mm or less. The emulsions should not be made into a shape or thickness that prevents radiation from penetrating at least halfway through it (so the emulsion can be fully polymerized by exposing each side). The allowable thickness will depend on the materials used, the nature of the polymerizing actinic radiation, the photoinitiator type, and the amount of photoinitiator used. Decreasing the amount of photoinitiator can decrease the light absorption of the emulsion and may increase light penetration, depending on the light scattering effects of the emulsion. If scattering effects dominate, reducing the photoinitiator level will have little effect on light penetration. Foams thicker than 8–10 mm could be made by photopolymerizing a sequence of layers, with each new emulsion layer being placed on the previously polymerized layers and being of a thickness that would allow light to penetrate through its entire depth.

Articles

The foams may be made into sheets, slabs, and other shapes. The thickness of a an article can vary and may depend on process conditions such as the composition, wavelength and intensity of the curing light, and photoinitiator type and amount.

Layered articles may be made by layering the emulsion with other polymerizable or non-polymerizable materials so long as the materials used are sufficiently transparent to the wavelength absorbed by the photoinitiator in the emulsion, or so long as the foam comprises an outer layer of a structure such that the emulsion can be fully penetrated by a sufficient amount of the radiation at the wavelength being used. Multilayer articles may also be made by post-production processes such as laminating. The layered articles may have a myriad of different properties depending on the composition, bulk density, cell sizes, window sizes, etc. of the foams. The layers may differ by more than 20% with respect to, for example, content of a particular component and density.

Multi-regional articles may be made by a number of methods. They may be made by adding pieces of polymerized foam to an emulsion that is subsequently cured. They may also be made by carefully mixing two or more emulsions prior to curing. The different regions or areas in the resulting foam article may differ with respect to composition, density, color, or other properties.

The foams of the present invention are suitable for many uses including, for example, membranes, absorption (such as when used as a wound dressing), filtering, sound dampening, and insulation. By varying the starting material and processing conditions, the foam structure can be tailored to have particular properties suitable for their intended uses.

Some foams of the present invention will remain in a collapsed state after removal of the immiscible fluid. The inventors found that as these foams absorb fluid and change from a collapsed state to a rehydrated state, their bulk densities decreased by at least 10%. These foams can be transparent or translucent when dry and can become opaque as they absorb fluid. When the foams absorb organic liquids, it is possible for them to swell beyond their original dimensions.

Foams comprised of pressure sensitive adhesives can provide adhesive foam articles that do not require the separate application of an adhesive layer. This is beneficial in some applications requiring adherence of the foam to another surface.

When used for fluid absorption, most preferred polymeric foams are sufficiently hydrophilic to permit the foam to absorb aqueous fluids. The level of hydrophilicity can depend on the starting material. Foams created from an emulsion having a non-water immiscible phase and monomers that are water soluble would be very hydrophilic and can take up water better than foams made with water insoluble monomers. Hydrophilicity may also be modified by post-production processes known in the art.

The foams of the present invention are generally hydrophilic and may provide desirable fluid handling properties such as good wicking and fluid distribution characteristics. These characteristics help vertical wicking, i.e., fluid wicking in a direction primarily normal to a major surface of the foam article. This is a desirable performance attribute for many absorbent foams because any imbibed fluid may be quickly moved away from the impingement zone. Foam articles that provide vertical wicking allow absorbed fluid to be moved from the foam surface to deeper within the absorbent core of the article. These characteristics help transport imbibed fluid away from the initial impingement zone and into the unused balance of the foam structure, which allows subsequent fluid flows to the initial impingement zone to be accomodated. The HIPE foams of the invention can absorb at least two and one-half times their weight in fluid, preferably up to, and greater than, 15 times their weight. The non-HIPE foams typically absorb 1 to 3 times their weight in fluid.

The foams can also have a relatively high storage capacity as well as a relatively high fluid capacity under load, i.e., under compressive load. The foams may be made to be sufficiently flexible and soft to be suitable for use against skin.

The fluid handling properties of a foam can be related to the foam's capillary structure. Foams having larger cell and window sizes tend to acquire fluid quickly but do not distribute fluid sufficiently against the force of gravity, nor do they store fluid effectively. Conversely, foams having smaller cell and window sizes are able to wick fluid against the force of gravity and store the fluid tightly, but are typically slower to acquire fluid.

Foams of the invention having different absorption characteristics may be layered to produce an absorbent article having layers of foams suited for fluid acquisition and distribution alternating with layers of foams that are suited for fluid storage.

In addition, patterned foam articles can be produced by shaping and curing the emulsion while in contact with a microstructured surface. After curing, the foam is separated from the microstructured surface and the foam retains the geometrical pattern of the surface. These conventional techniques are described in U.S. Pat. No. 5,691,846, incorporated by reference. The microstructured surface can be chosen from a wide variety of geometrical shapes that include cavities, channels, posts, or profiles. The pattern can be selected depending on the desired use of the foam.

Some foams of the present invention may be suitable for use as filters. The open-celled foams of the present invention can allow fluids (including air and liquids) to pass through, while the cells and windows can trap particles. The optimum foam structure, including cell sizes and number of windows, will depend on the fluid being filtered and the size of the particles to be removed.

Emulsion

Reactive Phase

The continuous (reactive) phase of an emulsion of the present invention comprises monomers that form the polymer matrix, or struts, of the foam structure after polymerization. The reactive phase comprises at least one polymerizable material at least one emulsifier, and at least one multifunctional crosslinking agent. However, the polymerizable material and crosslinking agent may be the same multifunctional material. Additionally, the polymerizable material and the emulsifier may be the same material, as in the case where the emulsifier is a reactive surfactant. A reactive surfactant may make a foam more hydrophilic or hydrophobic, depending on its structure. A photo-initiator may also be present in the reactive phase.

Selection of particular types and amounts of monomers and optional comonomers, emulsifiers, and multifunctional crosslinking agents can be important in obtaining a foam having the desired combination of structural, mechanical, and fluid handling properties to render the foam materials suitable for their intended uses. The components of the reactive phase should be substantially insoluble in the immiscible phase. Additives, including materials that do not participate in the polymerization reaction, can also be included in the reactive phase.

Polymerizable Material

The polymerizable material component comprises one or more monomers that may be photopolymerized. If the immiscible phase is water, the polymerizable material should be an ethylenically-or-acetylenically unsaturated substantially water-insoluble monomer. If the immiscible phase is nonaqueous, the polymerizable material may be a cationically-curable monomer, an ethylenically- or acetylenically-unsaturated monomer, or a water-soluble monomer. Suitable ethylenically or acetylenically unsaturated monomers include, for example, the ($C_1$–$C_{14}$) alkyl acrylates such as acrylic acid, butyl acrylate, n-butyl acrylate, hexyl acrylate, octyl acrylate, isooctyl acrylate, 2-ethylhexyl acrylate, nonyl acrylate, isononyl acrylate, decyl acrylate, dodecyl (lauryl) acrylate, isodecyl acrylate, tetradecyl acrylate; aryl and alkaryl acrylates such as benzyl acrylate and nonylphenyl acrylate, the ($C_4$–$C_{16}$) alkyl methacrylates such as methacrylic acid, hexyl methacrylate, octyl methacrylate, nonyl methacrylate, isononyl methacrylate, decyl methacrylate, isodecyl methacrylate, dodecyl (lauryl) methacrylate, tetradecyl methacrylate; acrylamides such as N-octadecyl acrylamide, and substituted acrylamides. Other ethylenically-unsaturated monomers that will copolymerize with acrylates may also be used. Suitable types of co-monomers include maleimides and azlactones. Styrenes are not preferred for the present invention due to their slow polymerization rate, but may be present in amounts of up to 4 weight percent when UV or visible light is used as the radiation source. Suitable styrenes include ($C_4$–$C_{12}$) alkyl styrenes such as p-n-octylstyrene. Combinations of any of these monomers may also be used.

Other functionalized acrylate monomers can also be used including polyester acrylates, urethane acrylates, and acrylates of epoxidized oils.

If the immiscible phase is non-aqueous, monomers that are difficult to polymerize in the presence of water, e.g., cationically-curable monomers and water-soluble or highly hydrophilic monomers, may be used in the reactive phase. Suitable cationically-curable monomers include those containing epoxide or vinyl ether functional groups. Suitable water-soluble or hydrophilic monomers include poly (ethylene glycol) acrylates of various molecular weights. The monomers listed above for aqueous emulsions may also be used with an emulsion having a non-aqueous immiscible phase.

Pressure Sensitive Adhesive (PSA) materials may also be used as a co-monomer. By proper selection of monomer(s), surfactant(s), initiator(s), and crosslinker(s), as known in the art foams with PSA properties can be produced.

The reactive phase may also comprise multifunctional monomers and/or oligomers. These multifunctional materials may operate as both the polymerizable material and crosslinking agent because the crosslinking functionality can be introduced into the reactive phase via a crosslinking site on a monomer or a separate crosslinking species. In such a case no other ethylenically-or acetylenically-unsaturated monomer is necessary in the reactive phase.

The polymerizable material component may comprise between 50 and 99, preferably 80 to 95, weight percent of the reactive phase.

Crosslinking Agents

Crosslinking agents are typically present to tie polymer chains together to create a more three-dimensional molecular structure. Selection of the particular type and amount of crosslinking agent will depend on the structural, mechanical, and fluid-handling properties desired in the resulting foam. Suitable crosslinking agents include monomers containing two or more ethylenically-or acetylenically-unsaturated groups such as polyfunctional acrylates, methacrylates, acrylamides, methacrylamides, and mixtures thereof. These include di-, tri-, and tetra-acrylates; as well as di-, tri-, and tetra-acrylamides; di-, tri-, and tetra-methacrylates; di-, tri-, and tetra-methacrylamides, and mixtures of these monomers. Specific examples include diethylene glycol diacrylate, trimethylol propane triacrylate, ethoxylated trimethylolpropane triacrylate, urethane acrylates, epoxy acrylates, polyester acrylates, oligomeric diacrylates.

Suitable acrylate and methacrylate crosslinking agents can be derived from diols, triols, and tetraols, that include 1,10-decanediol, 1,8-octanediol, 1,6-hexanediol; 1,4-butanediol; 1,3-butanediol; 1,4-but-2-enediol; ethylene glycol; diethylene glycol; trimethylolpropane; pentaerythritol; hydroquinone; catechol; resorcinol; triethylene glycol; polyethylene glycol; sorbitol; divinyl ethers and diepoxides; and the like.

If the emulsion has a nonaqueous immiscible phase, crosslinking agents sensitive to water such as diepoxides and divinyl ethers can be used in the reactive phase. Emulsions having non-aqueous immiscible phases can also use the crosslinking agents used in aqueous emulsions.

Crosslinking agents may comprise from 1 to 99 weight %, preferably 2 to 75 weight %, of the reactive phase.

Emulsifiers

Emulsifiers are also a component of the reactive phase of emulsions in the present invention. Suitable emulsifiers include reactive surfactants and non-reactive surfactants. Reactive surfactants, having ethylenically-or acetylenically-unsaturated bonds, can participate in the polymerization and crosslinking of the the polymerizing materials in the reactive phase and thereby become part of the foam structure. Reactive surfactants are typically preferred over non-reactive surfactants because they do not leach out of the resulting foam article during use. This can be particularly beneficial in applications where the foam comes into contact with skin.

In a water-in-oil emulsion, the emulsifier preferably has a hydrophilic to lipophilic balance (HLB) of 3 to 14, usually 4 to 6, depending on the monomer(s) used.

Suitable classes of non-ionic emulsifiers for water-in-oil emulsions include polyoxyethylenated alkylphenols, polyoxyethylenated straight-chain alcohols, polyoxyethylenated polyoxypropylene glycols, polyoxyethylenated mercaptans, long-chain carboxylic acid esters, alkanolamine condensates, tertiary acetylenic glycols, polyoxyethylenated silicones, N-alkylpyrrolidones, fluorocarbon liquids, and alkylpolyglycosides. Specific emulsifiers most suited to water-in-oil emulsions include sorbitan monoleate, glycerol monoleate, polyethylene glycol (200 molecular weight) dioleate, Castor oil, glycerol monoricinoleate, distearyl dimethylammonium chloride, dioleyl dimethylammonium chloride, and bis-tridecyl sulphosuccinic acid (sodium salt). Cationic and anionic surfactants can also be used as emulsifiers in this invention. When the immiscible phase is non-aqueous, other classes of emulsifiers, such as fluorocarbon liquids, are available in addition to those listed above. In cases of cationic polymerization, it is preferable to use a non-ionic surfactant to avoid interfering with the polymerization reaction.

Suitable reactive surfactants for the water-in-oil emulsions include methoxypoly(ethyleneoxy) ethyl acrylate having 1 to 40 oxyethylene groups, alkylene polyalkoxy sulfate (MAZON SAM 211-80, BASF, Mount Olive, N.J.), and copolymerizable alkoxy surfactant (MAZON SAM-185 now known as ABE 1215, BASF, Mount Olive, N.J.). The emulsifiers listed at col. 20, lines 55 et seq, and col. 21–22 of U.S. Pat. No. 5,856,366 may also be used in the present invention.

These same emulsifiers and surfactants, as well as others, can be used when the immiscible phase is nonaqueous.

The type of surfactant used can affect the microstructure of the resulting foam. The applicants found that depending on the reactive surfactant used increased emulsion agitation resulted in different cell sizes and/or number of cell windows.

Emulsifiers typically comprise up to 30 weight percent of the reactive phase.

Photoinitiators

Photoinitiators can rapidly and efficiently respond to a light source with the production of radicals and other species that are capable of initiating a polymerization reaction. Preferably the photoinitiators used in the present invention absorb at wavelengths of 200 to 800 nanometers, more preferably 300 to 800 nanometers, most preferably 300 to 450 nanometers. The photoinitiator provides a convenient trigger for the polymerization reaction. If the photoinitiator is in the reactive phase, suitable types of oil-soluble photoinitiators include benzil ketals, α hydroxyalkyl phenones, α amino alkyl phenones, acylphospine oxides. Specific initiators include 2,4,6-[trimethylbenzoyldiphosphine] oxide in combination with 2-hydroxy-2-methyl-1-phenylpropan-1-one (50:50 blend of the two is sold by Ciba Geigy as DAROCUR 4265); benzil dimethyl ketal (sold by Ciba Geigy as IRGACURE 651); α, α dimethoxy-α-hydroxy acetophenone (sold by Ciba Geigy as DAROCUR 1173); 2-methyl-1-[4-(methyl thio) phenyl]-2-morpholino-propan-1-one (sold by Ciba Geigy as IRGACURE 907); Oligo [2-hydroxy-2-methyl-1-[4-(1-methylvinyl) phenyl] propanone] (sold as ESACURE KIP EM by Lamberti s p a); Bis(2,4,6-trimethylbenzoyl)-phenylphosphineoxide (sold by Ciba Geigy as IRGACURE 819). Other suitable initiators are those disclosed in U.S. Pat. No. 5,545,676, PCT/US98/04458, and PCT/US98/04029, all of which are incorporated by reference.

Photoinitiators may comprise between 0.05 and 10.0, preferably between 0.2 and 10, weight percent of the reactive phase. Lower amounts of photoinitiator allow light to better penetrate the emulsion, which can provide for polymerization deeper in the foam layer. However, there must be enough initiator to initiate the polymerization and overcome oxygen inhibition. Further, light scattering by the emulsion, which also affects light penetration depth, is not affected by photoinitiator concentration.

Reactive Phase Additives

The reactive phase may contain inert ingredients, such as polymers that are dissolved, but do not undergo polymerization. These ingredients may add strength or toughness to the polymerized foam. Suitable monomer additives include isoprene, butadiene, 1,3-pentadiene, 1,3,7-octatriene, and β-myrcene. Suitable polymer additives include polyisoprene, polyethylene, polypropylene, polybutadiene, and acrylic tougheners. Other suitable reactive phase additives include flame retardants, fillers, $CaCO_3$, and carbon black.

The reactive phase may also comprise materials that can incorporate subsequently reactive functional groups into the foams during their fabrication. Many functional groups can be incorporated as vinyl groups (e.g., vinyl dimethyl azlactone) or acrylate esters or other acrylate and methacrylate groups (e.g., hydroxyethyl acrylate, acrylamide, butylmethacrylates). Reactive functional groups that may be incorporated include carboxylates, amines (including primary, secondary, tertiary, and quarternary amines and polyamines), sulfhydryls, azlactones, aldehydes, epoxides, maleimide isothiocyanates, isocyanates, n-alkyl groups (e.g., butyl, octyl, and octadecyl groups), phenyl and benzyl groups, cycloalkyl groups, hydroxy and hydroxyethyl groups, amides including (acrylamides), sulfonates, sulfonamides, phosphates, polyphosphates, iminodiacetates, various bypryridyl groups, salicylates, polyethers (including crown and cryptand ethers), and cyclodextrans.

When the reactive phase contains additives, the polymerizable material(s) may comprise less than 50% of the reactive phase.

Immiscible Phase

The immiscible phase may comprise any suitable fluid that is substantially immiscible with the polymerizable material(s) in the reactive phase and is a liquid at operating conditions. The most familiar immiscible phase is water. The immiscible phase may comprise a photoinitiator or emulsifier. Unlike most thermally-cured emulsions, the emulsions of the present invention do not require salts to stabilize the emulsion, although they may be added.

The immiscible phase fluid should have a viscosity of at least 1 centipoise at the use temperature. The upper viscosity limit for the immiscible phase will depend on the viscosity of the reactive phase and the desired foam structure. The immiscible fluid should not absorb light in the same wavelength as the photoinitiator being used. Suitable fluids other than water include, for example, fluorocarbon liquids and organic liquids in which the reactive phase is immiscible. Using a non-aqueous discontinuous or cocontinuous phase can allow different types of reaction chemistries for polymerizing the foams. For example, cationic photopolymerization or free radical polymerization of water soluble and very hydrophilic materials.

Photoinitiators

Photoinitiators soluble in the immiscible phase may be used in the present invention. Suitable photoinitiators include those disclosed in U.S. Pat. No. 5,545,676, incorporated by reference. The photoinitiator used should absorb light at the wavelength used to polymerize the emulsion, and should be effective for the type of polymerization used, e.g., free radical or cationic. Preferably the photoinitiators used in the present invention absorb at wavelengths of 200 to 800 nanometers, more preferably 300 to 800 nanometers, most preferably 300 to 450 nanometers.

Salts

Salts in the immiscible phase can increase the stability of the emulsion by minimizing the tendency of monomers, comonomers, and crosslinkers that are primarily soluble in the reactive phase to partition into the immiscible phase. Suitable salts for an aqueous immiscible phase include mono-, di-, or tri-valent inorganic salts including water-soluble halides, e.g., chlorides, nitrates, and sulfates of alkali metals and alkaline earth metals such as sodium chloride, calcium chloride, sodium sulfate, and magnesium sulfate and other salts described in U.S. Pat. No. 5,352,711, incorporated by reference. Hydratable inorganic salts may also be incorporated into the foams to increase hydrophilicity. Aqueous salt solutions may be used to treat the foams after removal of, or as part of the process of removing, a residual aqueous immiscible phase from a just-polymerized foam.

When the immiscible phase is non-aqueous, salts having organic cations or anions may be used. Suitable salts include, for example, borates, trifluoromethane sulfonates (triflates), and hexafluorophosphates.

If present in an emulsion of the present invention, the salts preferably comprise less than 0.2 wt %, more preferably less than 0.1 wt % of the immiscible phase.

Immiscible Phase Additives

The immiscible phase may contain additives such as ion exchange beads, fibers, and particulates. If the immiscible phase is removed after polymerization, these additives may remain in the foam by coating onto the interior surfaces of the foam cells or structure through physical entrainment or through deposition during immiscible phase removal. For example, evaporation can leave salts behind. Soluble species, such as polymers, might also be added to the immiscible phase to provide enhanced mechanical strength to the emulsion or the polymerized foams.

Emulsion Additives

The emulsion may also include additives that are not soluble in either the reactive or immiscible phase. Examples of suitable additives include ion exchange beads, fibers, particles, other foams, as described in U.S. Pat. No. 5,037,859, incorporated by reference, pigments, dyes, carbon black, reinforcing agents, solid fillers, hydrophobic or hydrophilic silica, calcium carbonate, toughening agents, flame retardants, antioxidants, finely ground polymeric particles (e.g., polyester, nylon, polypropylene, or polyethylene), expandable microspheres, glass beads, stabilizers (e.g., UV stabilizers), and combinations thereof.

The additives may be added in amounts sufficient to obtain the desired properties for the foam being produced. The desired properties are largely dictated by the intended application of the foam or foam article. The additives should be selected such that interference with photopolymerization is minimized.

This invention may be illustrated by way of the following examples.

EXAMPLES

Test Methods

Foam Density

The weight of individual dry foam samples was measured on a Mettler Toledo balance (Model AG 245, Greifensee, Switzerland) and an Archimedes-type device was employed to measure water displacement. Initially, the density measurements were complicated by the fact that the samples absorbed water very rapidly. To remedy this problem, the samples were spray coated with clear acrylic lacquer and allowed to dry prior to water displacement measurement. The lacquer created a coating and sealed the pores so water absorption during density measurement was greatly reduced.

The density of some samples was determined by an alternate method based on the amount of water uptake of the sample with the assumption that all the voids in the foam become filled by water, and that the struts of the foam are not swollen by water.

Absorbency

Initial sample weight measurements were taken on all dry foam pieces. The samples were then submerged for a predetermined amount of time in deionized water at room temperature. The samples were removed from the water and weighed. The final absorbency ratio was reported as the ratio of wet sample mass (grams) to initial dry sample mass (grams) after the sample had reached its maximum capacity for water uptake. The final capacity was typically reached within 30 seconds.

Gurley Number

The Gurley number of a sample represents the amount of time it takes to force a certain volume of air through a fixed area of a sample with a constant pressure. It is a measurement of the permeability of the samples to gases. Samples of the present invention were tested on a Teledyne Gurley Tester (Model 4110, Troy, N.Y.) with a GENUINE GURLEY 4320 automatic digital timer. The porous foam samples were placed between clamp plates and pressure was applied to a cylinder piston positioned on the upstream side of the sample. All samples had 50 ml of air forced through an area of ($1$ in$^2$). Gurley measurements were done in sets of four on samples without removing and replacing the sample in the apparatus. The number reported is the average of the four values obtained.

Tensile Test

Tensile testing was conducted by using a freshly sharpened die to cut samples into a shape having a rectangular center portion for testing and wider ends for fastening the sample into pull arms. The center section had a width of 0.5 cm and a gage length of 1.5 cm. Three to five specimens were used for each test. Sample thickness was measured with a digital micrometer for each sample before the test. A Sintech 20 Tensile Tester with Test Works software (available from MTS Systems Corp, Eden Prairie, Minn.) was used to acquire data.

A 150-gram load cell was used (calibrated electronically), with a 20-gram weight. The samples were pulled in the length-wise direction at 2.54 cm/min. Soft adjustable spring rate fixtures were used to grip the specimens between the crossheads during the test.

Scanning Electron Microscope

The SEM micrographs were taken with either a JEOL 35C or a JEOL Model 840 SEM (Peabody, Mass.). Foam samples that did not exhibit any collapse upon drying (removal of the immiscible phase) were freeze fractured under liquid nitrogen, sputter coated with either gold or a gold palladium (60/40) mixture, and the cross-sections were imaged. Foams that collapsed partially or completely upon drying were imaged in the swollen state by performing a crude freeze-drying procedure. The freeze dried samples were prepared by swelling them completely in water (15–30 minutes), then immersing them in a pool of liquid nitrogen to freeze them in the swollen state. The pool of liquid nitrogen (containing the frozen sample) was placed into a vacuum evaporator (Denton Vacuum Model DV-502A, Moorestown, N.J.) and the sample was left under vacuum for approximately 16 hours. When the sample was removed from the evaporator, it was dry but was not in the collapsed state. The dry sample cross section was then sputter coated and imaged as described above.

Example 1

Example 1 describes a batch process for making the foam emulsions of the present invention. The oil phase consisted of twelve grams of isobornyl acrylate (SR 506, Sartomer Co., Exton, Pa.), 69 grams of 2-ethyl hexyl acrylate (Aldrich Chemical Co., Milwaukee, Wis.), 15.1 grams of sorbitan monooleate (Aldrich Chemical Co., Milwaukee, Wis.), 12 grams of trimethylolpropane triacrylate (TMPTA-N, UCB Chemicals, Smyrna, Ga.), and 7.8 grams of DAROCUR 4265 (Ciba Geigy, Hawthorne, N.Y.), which were added to a glass jar and mixed by hand. This mixture comprised the oil phase mixture. 51.69 grams of this oil phase mixture were placed into a plastic tri-pour beaker. The mixture was agitated continuously with a Jiffy Stirrer (an air-driven impeller containing a Jiffy Stir mixing attachment, Cole Parmer item number P-04541-00, Vernon Hills, Ill.). The rotational speed of the Jiffy Stirrer was affected by the viscosity of the medium being stirred, so the rotational rate of the Jiffy Stirrer was neither known nor exactly controlled. The diameter of the Jiffy Stir Impeller was 6.67 cm.

Deionized water was added slowly (approximately 2 ml every 6 seconds) to the agitating oil phase mixture, and the total weight of the mixture was measured periodically on a balance. As the water content of the emulsion increased, so did the viscosity. After 574.31 grams of water had been added, the emulsion had a uniform consistency with a small amount of free water at the top. A sample was withdrawn from the center of the emulsion. The sample was allowed to sit in a glass beaker for 15 minutes prior to being polymerized, during which time a small amount of water separated from the sample. The sample had a water:oil ratio of approximately 11:1.

The polymerization was completed by pouring the liquid emulsion onto a piece of quartz that had TEFLON spacers forming a dike. A second piece of quartz was placed on top of the dike creating an enclosed sheet of emulsion 0.20 cm thick. The encased sample was then passed under a Fusion (Gaithersburg, Md.) F600 Irradiator equipped with a D Bulb operating at 100% power, in focus, with a conveyer speed of 20 feet/min. The sample received a total of 6 passes under the Fusion light (3 on each side) with alternating sides exposed to the light on each pass. Quantitative light measurements for a single pass under the F600 D lamp have been included in Table 1. The measurements were taken with a Power Puck (10 Watt, EIT, Sterling, Va.). After exposure to the light, the sample was a wet solid, so it was placed on a piece of silicone-coated release liner and put into a forced-air oven (Despatch Model LAC1-38A-4, Minneapolis, Minn.) at 70° C. overnight to dry. Micrographs of this sample are shown in FIG. 1.

The density of the dry foam sample was 0.20 grams/cc as measured by water displacement. The sample was coated with a thin layer of a clear acrylic spray paint before measurement (to prevent the sample from swelling when immersed in water). A second density measurement, based on the water uptake of the sample indicated that the density of the foam decreased to 0.08 grams/cc when wet.

TABLE 1

| Light measurements made with a 10 Watt Power Puck | | |
|---|---|---|
| Spectral Range | Joules/cm$^2$ | Watts/cm$^2$ |
| UVA | 2.213 | 4.464 |
| UVB | 0.613 | 1.146 |
| UVC | 0.034 | 0.056 |
| UVV | 1.269 | 2.647 |

Examples 2 and 3

Examples 2 and 3 were made using a reactive surfactant (emulsifier) in the emulsion and different mixing methods.

Examples 2 and 3 were made by mixing isobornyl acrylate (0.4020 grams), 2-ethyl hexyl acrylate (2.2984 grams), SAM 211-80 (0.4995 grams, BASF, Mount Olive, N.J.), trimethylolpropane triacrylate (0.4067 grams), and DAROCUR 4265 (0.2448 grams), in a glass beaker by hand to create an oil phase mixture.

The oil phase mixture was agitated during emulsion preparation with a magnetic stir plate (Catalog Number 58935-351, VWR Scientific, Chicago, Ill.). Deionized water (25.90 grams) was added dropwise (approx. 1 drop per second) to the oil phase during agitation via a separatory funnel mounted over the stir plate. A homogeneous, opaque emulsion was prepared by this method. Example 2 comprises one half of the emulsion removed after the water addition was complete. Example 2 was polymerized immediately, using the same method described in Example 1. Example 3 comprises the other half of the emulsion. It received some additional agitation using a three-blade air-driven impeller for less than one minute. After the additional agitation, the Example 3 emulsion was polymerized (also as described in Example 1). The polymerized samples had shiny white surfaces, and were placed on a silicone-coated release liner in a forced-air oven overnight at 70° C. to dry.

Figure 2A:
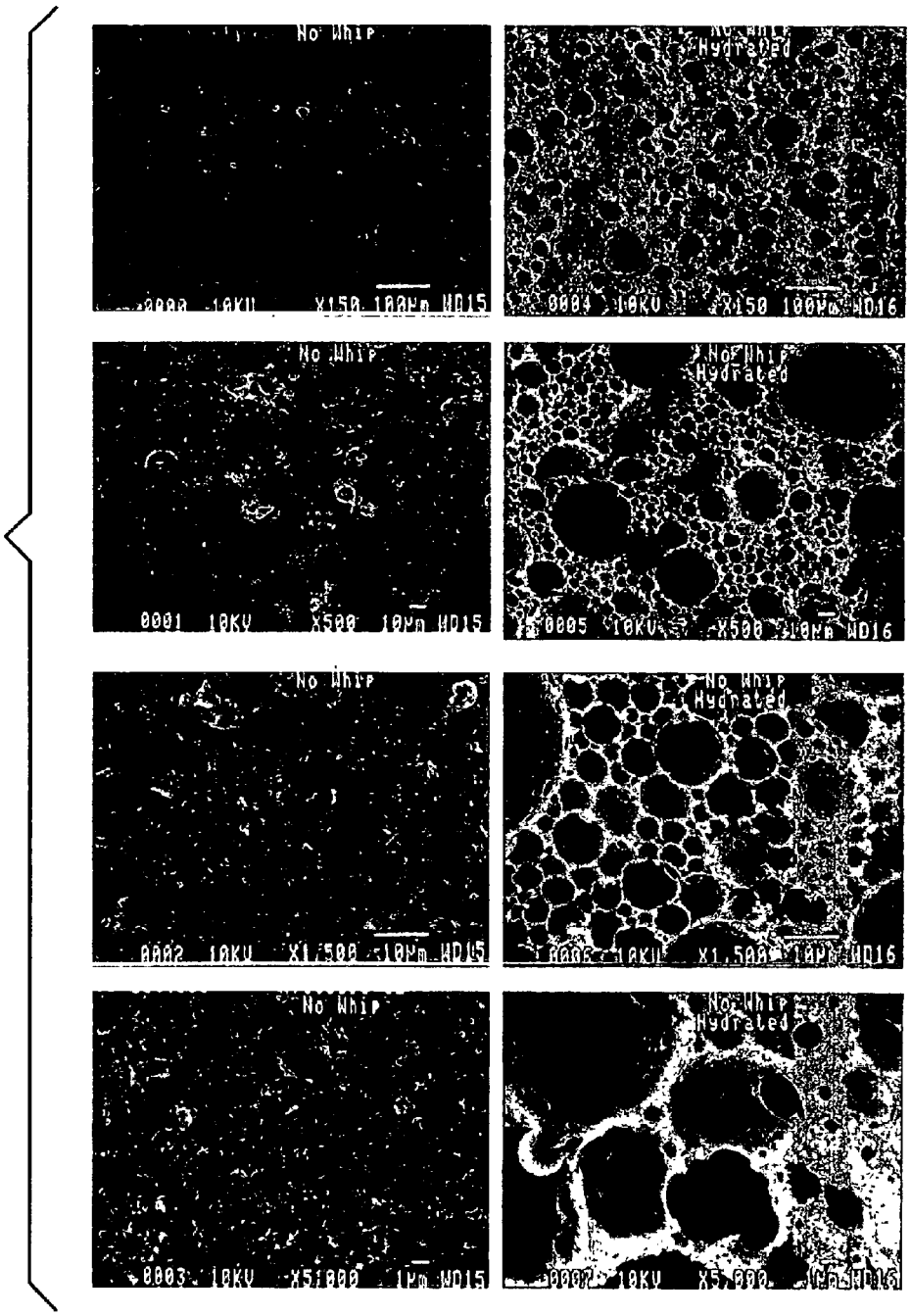
FIGS. 2a and 2b show SEM digital image micrographs of cross sections of open-cell foams of the present invention wherein the foam shown in 2b was agitated more than the foam shown in 2a. The left-hand columns of micrographs in both 2a and 2b show the foams in an unhydrated (collapsed) state; the right-hand columns show the foams in a hydrated state (SEMs were obtained by freeze-drying the samples). Magnifications of the foam, from top to bottom, respectively, are 150×, 500×, 1,500×, and 5,000×.
Figure 2B:
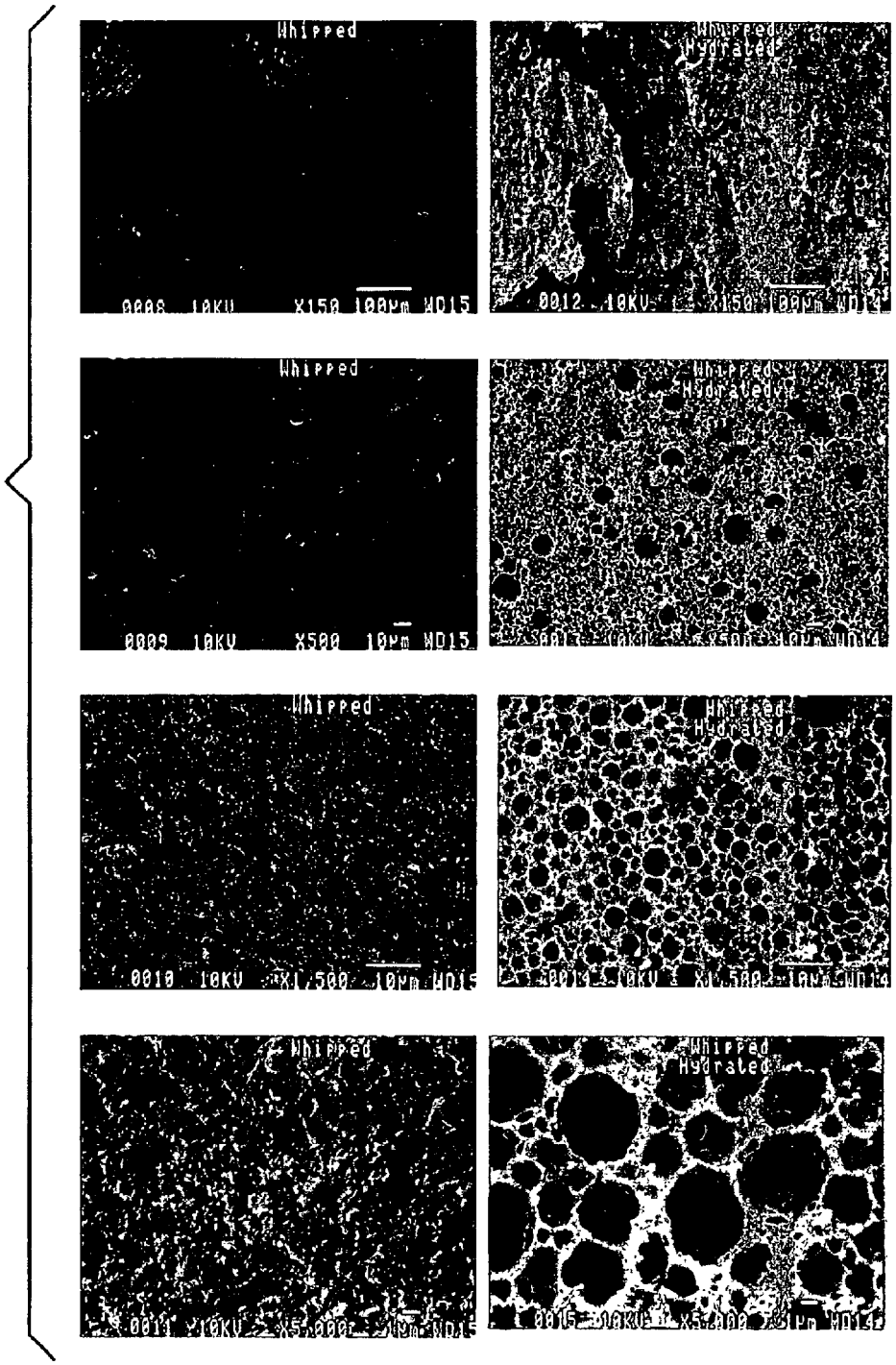

The dried samples collapsed completely, becoming translucent yellow disks that had some splitting marks caused by drying. After soaking in water for 10–15 minutes, the dried samples completely re-hydrated, became white and opaque again, and regained their original dimensions. The collapsed samples were submitted for SEM analyses. Photomicrographs were obtained of the collapsed structures as well as of the swollen structure (which was preserved after crudely freeze-drying the sample) of each of the samples. The micrographs are included in FIG. 2.

Examples 4–9

Examples 4–9 were made from the same emulsion but each example was allowed to age for a different length of time before polymerization.

Figure 3A:
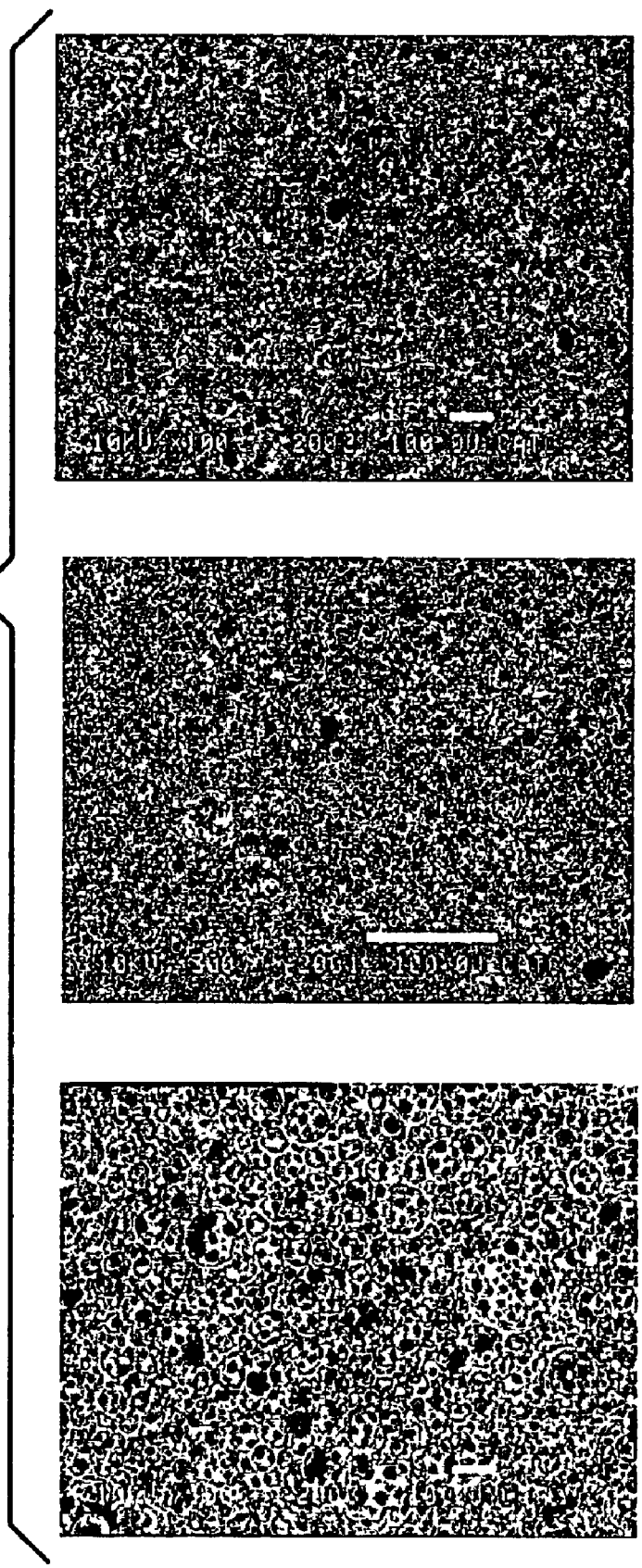
FIGS. 3a–3c show SEM digital image micrographs of cross sections of open-cell foams produced from the same emulsion but polymerized at different intervals after the emulsion was made. For 3a–3c, these times were immediate, 15 minutes, and 3 days, respectively. Magnifications of the foams, from top to bottom, respectively, are 100×, 300×, and 1,000×.
Figure 3B:
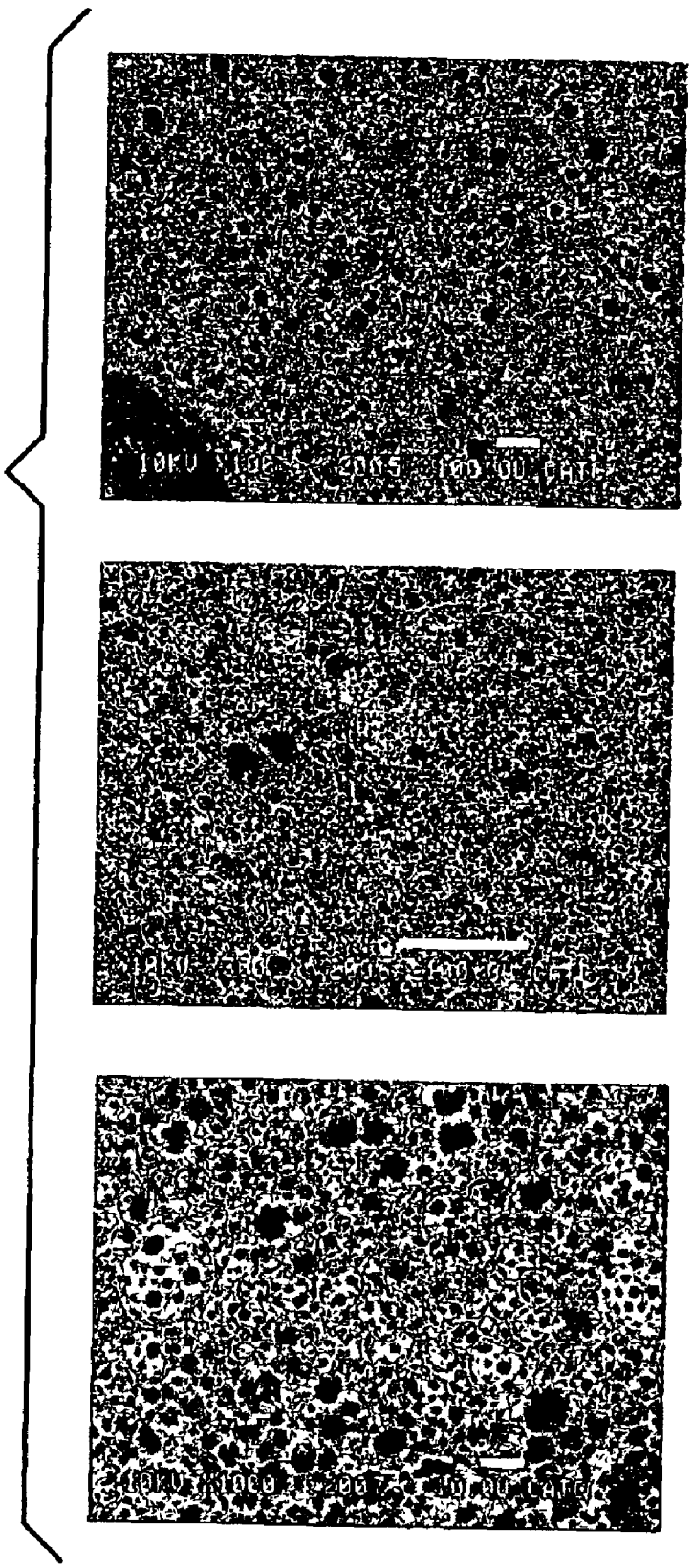
Figure 3C:
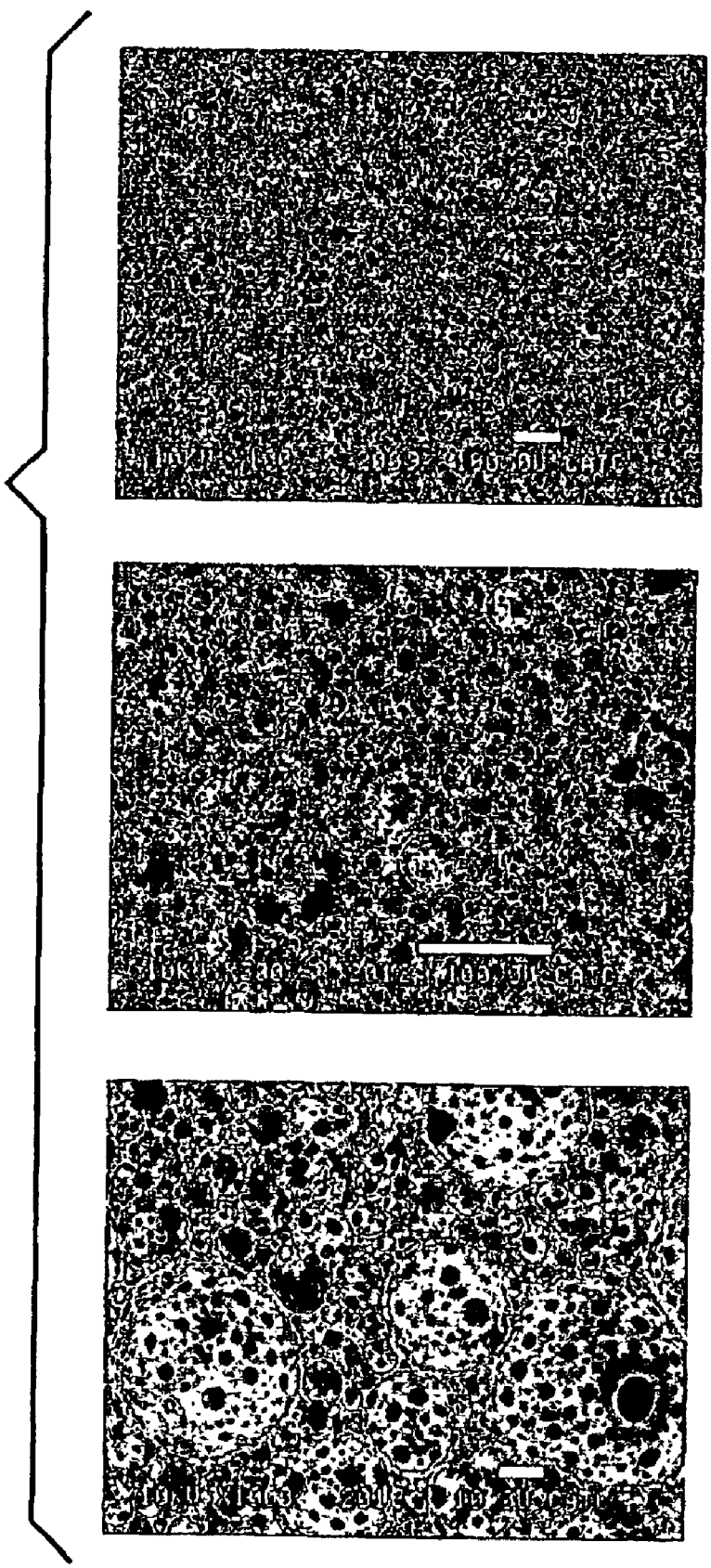

Example 4 was made by adding to a 1-Liter plastic tri-pour beaker isobornyl acrylate (8.0097 grams), diethylene glycol diacrylate (9.4252 grams SR230, Sartomer, Exton, Pa.), 2-ethylhexyl acrylate (42.0381 grams), sorbitan monooleate (8.4300 grams), trimethylolpropane triacrylate (4.5000 grams), DAROCUR 4265 (2.5061 grams), and MAZON SAM 185 (1.62 grams, BASF) to create an oil phase mixture. The oil phase mixture was agitated with a Jiffy Stir Impeller (diameter of 6.67 cm (2.5 in.)) driven by an air motor. The agitation speed was not recorded. 500 milliliters of deionized water was delivered at a rate of approximately 30 milliliters/min during the oil phase agitation. Example 4, comprising a 20 g sample of the emulsion, was polymerized to a thickness of 0.20 cm after the water addition was complete, following the procedure described in Example 1 at time zero (0). The remaining emulsion was allowed to reside at room temperature with a loose aluminum foil cover over it. Examples 5–9 were 20 g samples withdrawn from the aging emulsion and polymerized at the following times, measured from the time the emulsion was made: 15 minutes (Ex. 5), 59 minutes (Ex. 6), 164 minutes (Ex. 7) 339 minutes (Ex. 8), and three days later (Ex.9). The viscosity changed (decreased) the most between Examples 4 and 5. The emulsion viscosity did not change appreciably (as observed visually) for the remaining examples. The polymerized foam samples were dried in a forced-air oven overnight at 70° C. SEM micrographs were taken of Examples 4, 5, and 9. The micrographs are included as FIG. 3.

The micrographs show that the emulsion structure is undergoing subtle changes with time. This fact was also evidenced by the water uptake rates of the foams. Within 40 seconds of being immersed in water, Example 4 had absorbed approximately 6 times its weight in water, while Example 5 had absorbed approximately 4.5 times its weight in water. Examples 8 and 9 absorbed less than one times their dry foam weight within 40 seconds. These different absorptions occurred even though the densities of the foams were the same.

Examples 10–13

Examples 10–13 are foams of the present invention having different densities. Examples 10–12 were made from a single oil phase mixture. The oil phase mixture was made by combining and mixing the following components: isobornyl acrylate (0.7972 grams), 2-ethylhexyl acrylate (9.2156 grams), sorbitan monooleate (2.0044 grams), trimethylolpropane triacrylate (1.6568 grams), and DAROCUR 4265 (1.0764 grams). The components were stirred by hand and used as the oil phase for Examples 10, 11 and 12. The density of the foam is determined by how much water is added (dispersed) in the oil phase, with greater amounts of water leading to lower density foams and possibly different microstructures. The oil phase mixtures were then agitated with a magnetic stir plate during water addition via a separatory funnel (about 1 drop/sec). Deionized water in the quantity 50.24 grams was added to the Example 10 oil phase, 12.45 grams of water were added to the Example 1 oil phase, and 25.05 grams of water were added to the Example 12 oil phase.

Example 13 was prepared from a different oil phase to produce a sample with the same composition, but a different density than Examples 10–12. The oil phase mixture comprised isobornyl acrylate (0.4064 grams), 2-ethylhexyl acrylate (2.3435 grams), sorbitan monooleate (0.5085 grams), trimethylolpropane triacrylate (0.4160 grams), and DAROCUR 4265 (0.2592 grams). Deionized water in the amount of 6.24 grams was added as described above and an emulsion was created.

The emulsions were coated and polymerized into 0.20 cm thick sheets as described in Example 1. After polymerization, the samples were placed on a silicone-coated release liner and dried in a forced-air oven for 48 hours at 70° C.

Figure 4:
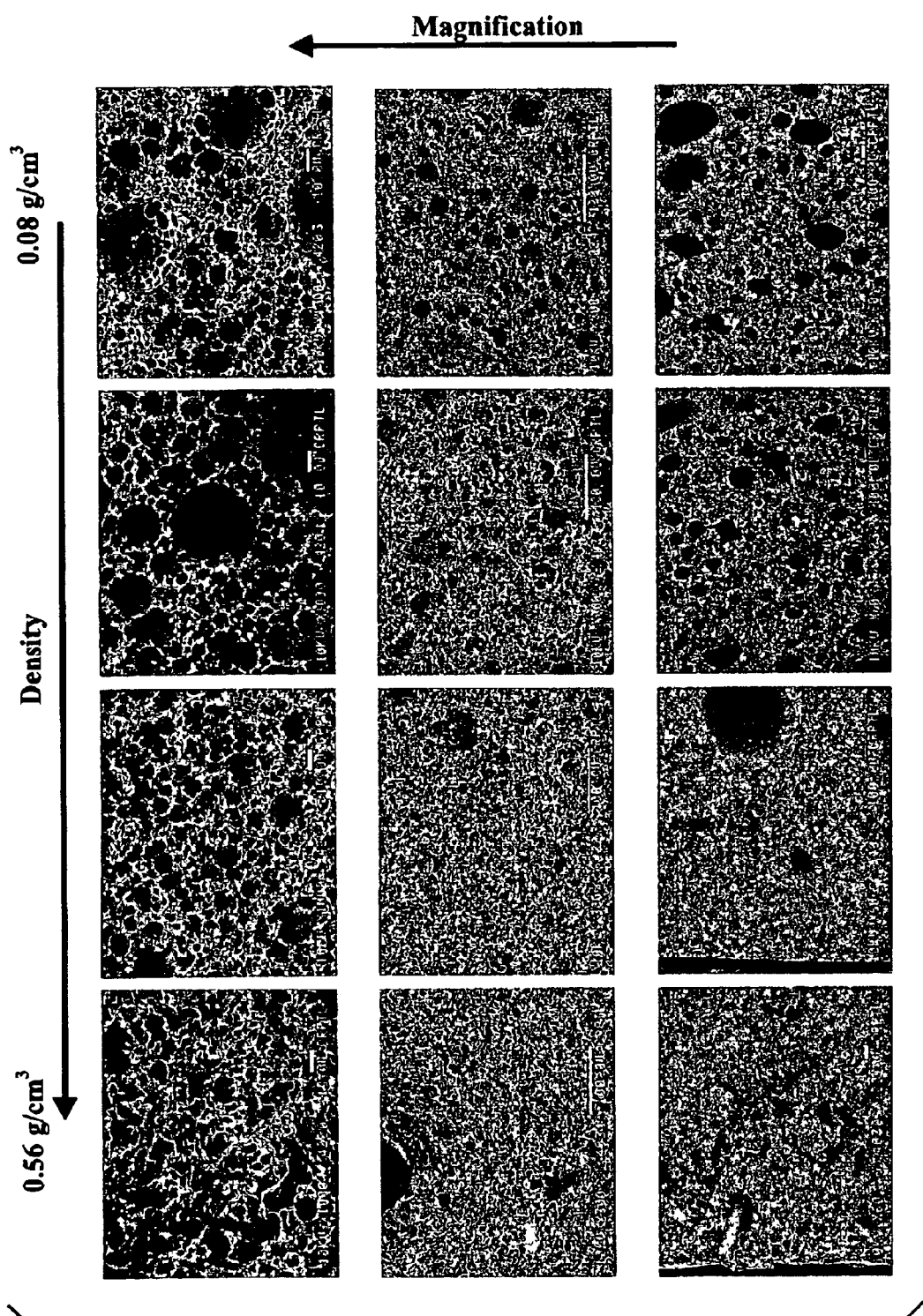
FIG. 4 shows SEM digital image micrographs of cross sections of open-cell foams of the present invention having different foam densities. The densities of the foams increase from right to left. Magnification of the foam increases from bottom to top, with the magnifications being 60×, 300×, and 1,000×, respectively.

The Gurley number, density and water uptake of the samples was measured. These data are included in Table 2. SEM micrographs were taken of the Examples. The micrographs are included as FIG. 4.

TABLE 2

Effect of Density on Gurley Number and Absorbency Ratio

| Example | Measured Density (Grams/ml) | Gurley Number (sec) | Absorbency Ratio (gram wet/gram dry) |
| --- | --- | --- | --- |
| 10 | 0.08 | 2.3 | 12.5 |
| 12 | 0.16 | 7.4 | 6.5 |
| 11 | 0.29* | 22.2 | 4.5 |
| 13 | 0.56 | 20.8 | 2.6 |

*The density of this sample was measured by displacement, but it was done without clear lacquer covering the sample. As a result, this is probably an overestimate of the true density.

Examples 14–16

Examples 14–16 have varying amounts of emulsifier (sorbitan monooleate.)

Example 14 was made by adding 0.3960 grams of isobornyl acrylate, 2.3120 grams of 2-ethylhexyl acrylate, 0.4943 grams of sorbitan monooleate, 0.4029 grams of trimethylolpropane triacrylate, and 0.2812 grams of DAROCUR 4265 to a beaker. The oil phase was emulsified with 25.13 grams of deionized water by continuous agitation on a magnetic stir plate during dropwise water addition via a separatory funnel (at approximately 1 drop/sec).

Example 15 was made by adding 0.4070 grams of isobornyl acrylate, 2.4033 grams of 2-ethylhexyl acrylate, 0.4138 grams of sorbitan monooleate, 0.4195 grams of trimethylolpropane triacrylate, and 0.2572 grams of DAROCUR 4265 to a beaker. These oil phase components were well mixed. The oil phase of this sample was emulsified with 25.02 grams of deionized water in the same manner as described in Example 14.

Example 16 was made by adding 0.4009 grams of isobornyl acrylate, 2.4929 grams of 2-ethylhexyl acrylate, 0.3132 grams of sorbitan monooleate, 0.4062 grams of trimethylolpropane triacrylate, and 0.2594 grams of DAROCUR 4265 to a beaker. These components were mixed well and are hereinafter referred to as the oil phase. The oil phase of this sample was emulsified with 25.55 grams of deionized water in the same manner as described in Example 14.

The emulsification formed white opaque emulsions for each example. Each emulsion was poured between quartz plates (as described in Example 1), and polymerized into 0.20 cm thick sheets of foam. They were dried in a forced-air oven at 70° C overnight.

Example 16 did make an emulsion, but started to destabilize rapidly as soon as the agitation was stopped, presumably because there was not a sufficient amount of emulsifier to adequately stabilize the emulsion. The rapidly-destabilizing sample was passed under the ultraviolet light within 30 seconds after the emulsion was obtained. After drying, the cells of this foam appeared large even to the naked eye.

Figure 5:
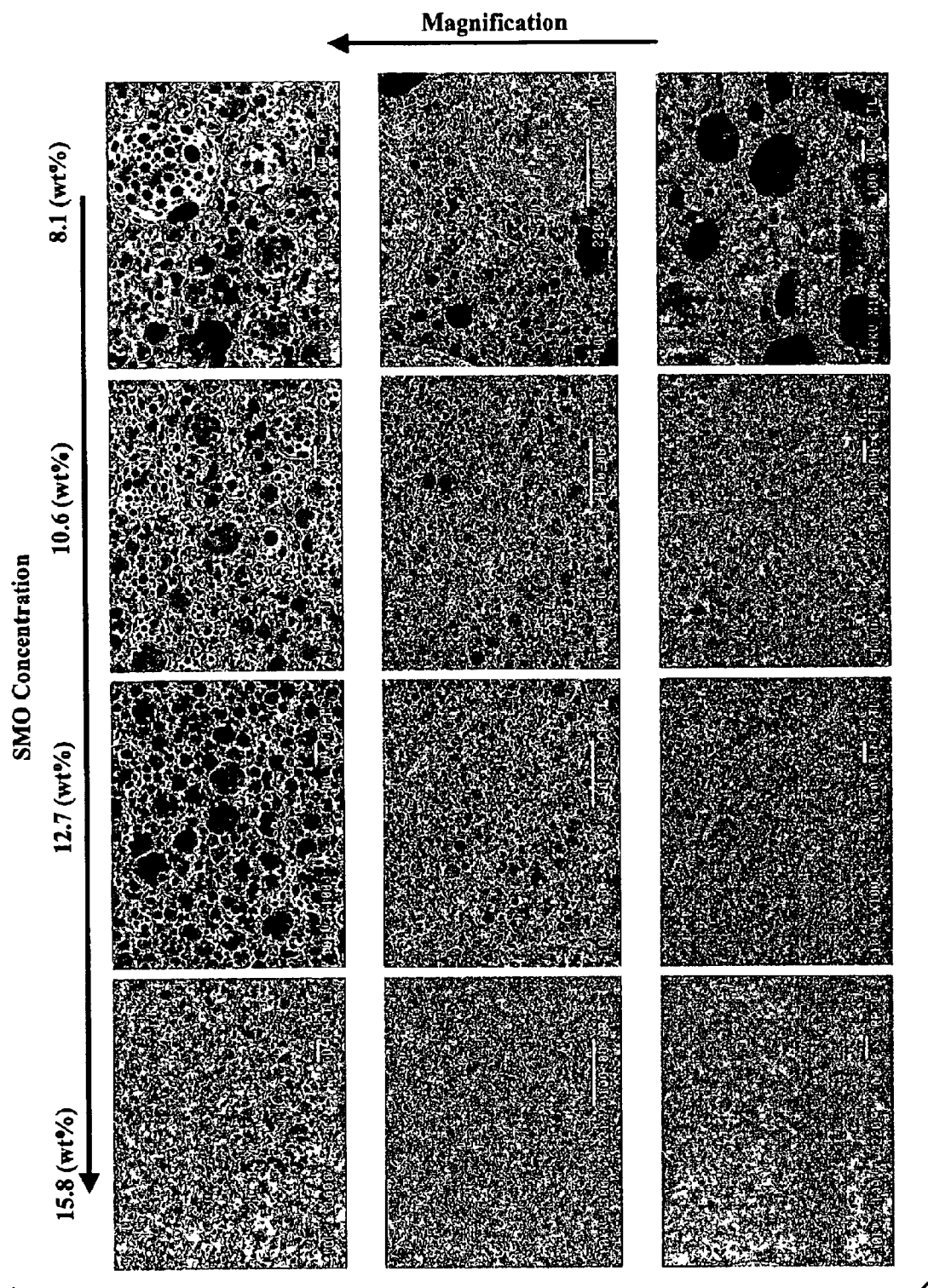
FIG. 5 shows SEM digital image micrographs of cross sections of open-cell foams of the present invention made with different amounts of emulsifier, sorbitan monooleate (SMO). Emulsifier concentration increases from right to left. Magnification of the foam increase from bottom to top, with the magnifications being 100×, 300×, and 1,000×, respectively.

Scanning electron micrographs of the sample cross-sections have been included in FIG. 5. The measured Gurley numbers, absorbency measurements and measured densities have been included in Table 3.

TABLE 3

Emulsifier Concentration and Density, Absorbency Ratio, and Gurley Number

| Example | SMO Conc. (wt % in oil phase) | Density (g/ml) | Absorbency Ratio (gram/gram) | Gurley Number (sec) |
| --- | --- | --- | --- | --- |
| 14 | 12.7 | 0.22 | 5.9 | 17.2 |
| 15 | 10.6 | 0.18 | 4.2 | 14.7 |
| 16 | 8.1 | 0.18 | 5.1 | 5.7 |

Example 17

Example 17 was polymerized with a Xenon flashlamp.

Example 17 was made by mixing in a beaker isobornyl acrylate (0.4028 grams), 2-ethylhexyl acrylate (2.3013 grams), sorbitan monooleate (0.5208 grams), trimethylolpropane triacrylate (0.4122 grams), and DAROCUR 4265 (0.2555 grams). These oil phase components were well mixed. The oil phase was emulsified with 25.52 grams of deionized water by adding the water dropwise at a rate of about one drop per second into the oil phase during constant agitation with a magnetic stir plate. A viscous white opaque emulsion resulted.

The emulsion was poured between two quartz plates (with 50 mil thick spacers) and passed under a Xenon flashlamp (Xenon Flashlamp, Model RC 742, Woburn, Mass.). The flashlamp was operated with a pulse frequency of 10 pulses per second with a peak intensity of 1800 Watts/cm$^2$. The sample was sent through the light twice on each side (total of four passes) with alternating sides toward the light source at 30 feet/min. The sample was removed from the quartz, and placed on release liner in a forced-air oven to dry overnight at 70° C.

Figure 6:
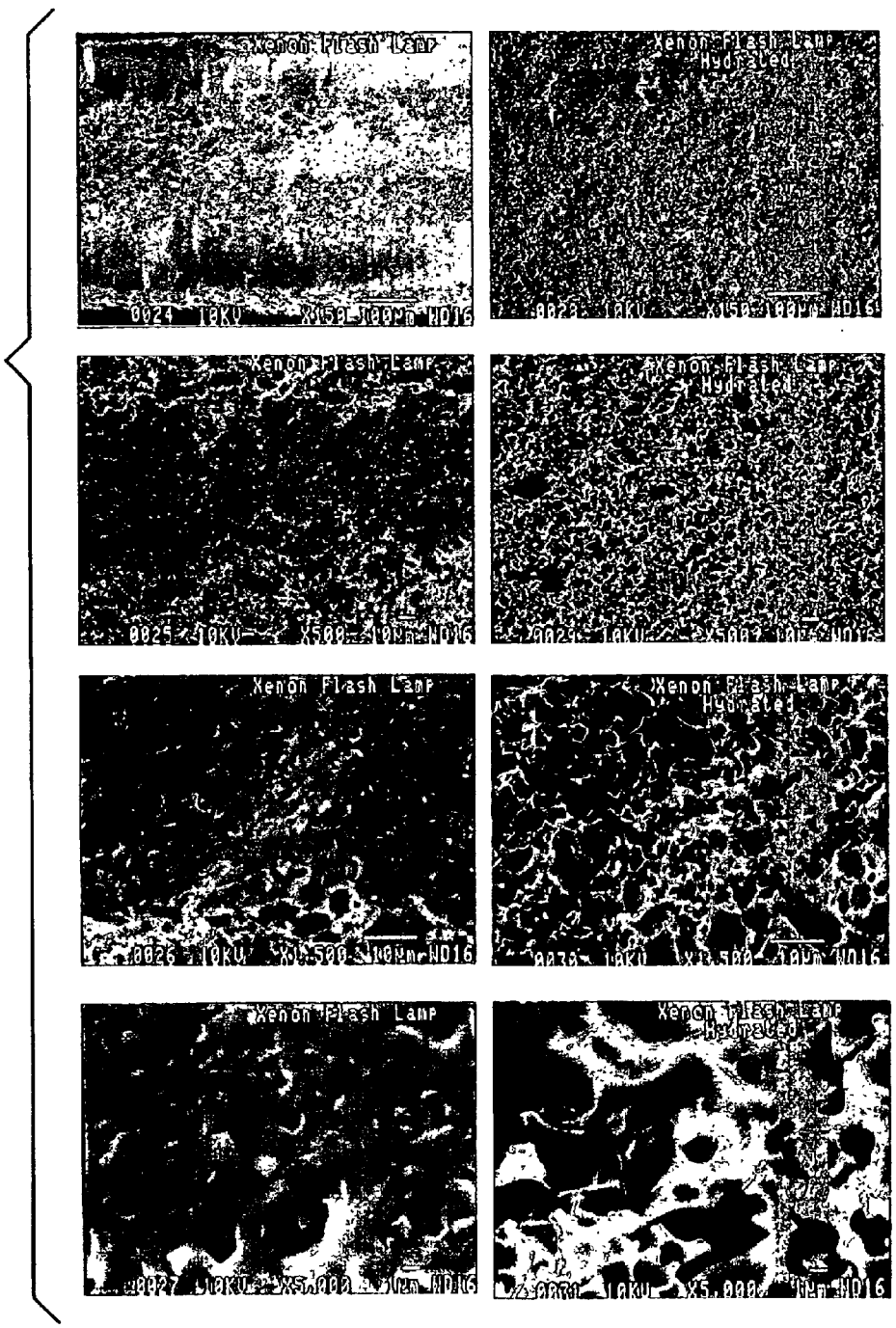
FIG. 6 shows SEM digital image micrographs of a cross section of an open-cell collapsible foam of the present invention in both an unhydrated (left column) and hydrated (right column) state. The foam was polymerized using a Xenon flashlamp. Magnifications of the foam, from top to bottom, respectively, are 150×, 500×, 1,500×, and 5,000×.

The process produced a crosslinked open-cell porous foam that partially collapsed upon drying. After drying, the sample had reduced considerably in thickness and had many spotty transparent regions. When examined with the SEM, the layering behavior in the dried sample was evident. When the sample re-hydrated, however, the layers of varying density were no longer visible. The SEM photomicrographs of this sample are contained in FIG. 6.

Examples 18–26

A series of samples with different chemical compositions were prepared for the purpose of investigating compositional effects on dry foam tensile strength.

Example 18 was prepared by combining in a beaker isobornyl acrylate (1.2032 grams), 2-ethylhexyl acrylate (1.4922 grams), sorbitan monooleate (0.5288 grams), trimethylolpropane triacrylate (0.4034 grams), and DAROCUR 4265 (0.2444 grams). These oil phase components were well mixed by hand. The oil phase was emulsified with 25.93 grams of water by the dropwise addition of water via a separatory funnel during constant agitation with a magnetic stir plate. The emulsion was then polymerized between two pieces of quartz separated by 0.20 cm shims by exposure to a Fusion F600 D lamp in focus at 100% power, and 20 feet per minute with six passes (three each on alternating sides). After polymerization, the sample was removed from the quartz plates and placed on a silicone-coated release liner to dry in a forced-air oven at 70° C. overnight.

Example 19 was prepared by combining in a beaker isobornyl acrylate (0.4400 grams), diethylene glycol diacrylate (1.2134 grams), 2-ethylhexyl acrylate (2.4960 grams), sorbitan monooleate (0.5327 grams), trimethylolpropane triacrylate (0.4034 grams), and DAROCUR 4265 (0.2557 grams). These oil phase components were well mixed by hand. The oil phase was emulsified with 24.95 grams of deionized water, as described in Example 18, then it was polymerized as described in Example 18. The resulting foam partially collapsed upon drying.

Example 20 was prepared by combining in a beaker an aromatic urethane acrylate (0.9035 grams CN973J75, Sartomer Co., Exton, Pa.), isobornyl acrylate (0.2060 grams), 2-ethylhexyl acrylate (1.6912 grams), sorbitan monooleate (0.5094 grams), trimethylolpropane triacrylate (0.3938 grams), and DAROCUR 4265 (0.2656 grams). These oil phase components were well mixed. The oil phase was emulsified with 26.07 grams of deionized water while being agitated with a Jiffy Stir impeller (with diameter of 1.25 inches) instead of the magnetic stir plate, due to its high viscosity. After being polymerized as described in Example 18, this sample was placed on a silicone-coated release liner in a forced-air oven at 70° C. to dry for approximately 48 hours.

Example 21 was prepared by combining in a beaker isobornyl acrylate (0.3979 grams), ditrimethylolpropane triacrylate (0.4800 grams SR355, Sartomer Co.), 2-ethylhexyl acrylate (2.2330 grams), sorbitan monooleate (0.5336 grams), and DAROCUR 4265 (0.2570 grams). These oil phase components were well mixed. The oil phase was emulsified with 25.21 grams of deionized water as described in Example 18. After polymerization, this sample was placed on a silicone-coated release liner in a forced-air at 70° C. to dry for about 48 hours.

Example 22 was prepared by combining in a beaker isobornyl acrylate (0.4008 grams), aromatic urethane acrylate (0.5013 grams CN972, Sartomer Co.), 2-ethylhexyl acrylate (1.4922 grams), sorbitan monooleate (0.5111 grams), trimethylolpropane triacrylate (0.4038 grams), Bisphenol A acrylate (0.4270 grams SR349, Sartomer Co.), and DAROCUR 4265 (0.25340 grams). These components were well mixed and are hereinafter referred to as the oil phase. The oil phase was emulsified with 25.10 grams of deionized water as described in Example 18, and polymerized as described in Example 18. After polymerization, this sample was placed on a silicone-coated release liner in a forced-air oven for approximately 48 hours.

Example 23 was prepared by the addition of the following components to a beaker, isobornyl acrylate (0.4063 grams), 2-ethylhexyl acrylate (2.4257 grams), sorbitan monooleate (0.5002 grams), trimethylolpropane triacrylate (0.3930 grams), and DAROCUR 4265 (0.3112 grams). These oil phase components were well mixed. The oil phase was emulsified with 25.00 grams of deionized water as described in Example 18, then polymerized and dried as described in Example 18.

Example 24 was prepared by combining in a beaker isobornyl acrylate (0.3933 grams), 2-ethylhexyl acrylate (0.8043 grams), tertbutylcyclohexyl acrylate (1.5033 grams TBCH, BASF), sorbitan monooleate (0.5367 grams), trimethylolpropane triacrylate (0.4274 grams), and DAROCUR 4265 (0.2526 grams). These oil phase components were well mixed. The oil phase was emulsified with 25.92 grams of deionized water as described in Example 18. This sample was polymerized with a Fusion F600 H lamp at 100% power, in focus at 20 feet/min with six passes total (alternating three per side). After polymerization, this sample was placed on a silicone-coated release liner and remained in a forced-air oven at 70° C. for approximately 48 hours. The thickness of this sample decreased upon removal of the immiscible phase.

Example 25 was prepared by combining in a beaker, isobornyl acrylate (0.4102 grams), polyester acrylate oligomer (0.8014 grams EBECRYL 1657, UCB Chemical Co.), 2-ethylhexyl acrylate (1.4999 grams), sorbitan monooleate (0.5285 grams), trimethylolpropane triacrylate (0.3989 grams), and DAROCUR 4265 (0.2481 grams). These components were well mixed and are hereinafter referred to as the oil phase. The oil phase was emulsified with 25.69 grams of deionized water. Half the emulsification was done using the magnetic stir plate, but when the sample became too viscous to agitate with the stir bar, the Jiffy Stir was used to finish the emulsification. After polymerization, this sample was placed on a silicone-coated release liner and remained in a forced-air oven at 70° C. overnight.

The samples were subjected to tensile testing. The results for peak stress, peak strain, energy and modulus are shown in Table 6. Peak stress and peak strain are the stress and strain values just prior to the sample fracturing. Energy is calculated as the integral of the stress/strain curve. Elastic modulus is calculated as the slope of the stress/strain curve at 10% strain. Stress and Modulus are reported in kiloPascals. Energy is reported in Newton-meters.

TABLE 6

Tensile Test Results

| Example | Peak Stress (kPa) | Peak Strain (%) | Energy (N · m) | Modulus (kPa) |
| --- | --- | --- | --- | --- |
| 18 | 75 | 79.38 | 0.0568 | 172 |
| 19 | 110 | 111.07 | 0.0047 | 138 |
| 20 | 30 | 52.75 | 0.0156 | 97 |
| 21 | 31 | 48.71 | 0.0130 | 41 |
| 22 | 45 | 43.83 | 0.0161 | 48 |
| 23 | 34 | 57.10 | 0.0179 | 48 |
| 24 | 127 | 43.18 | 0.0616 | 1082 |
| 25 | 90 | 42.31 | 0.0382 | 193 |

Example 26

Example 26 describes a continuous emulsion-making process for HIPE foams. 37.06 grams of isobornyl acrylate, 233.06 grams of 2-ethylhexyl acrylate, 48.16 grams of sorbitan monooleate, 40.15 grams of trimethylolpropane triacrylate, 16.24 grams of DAROCUR 4265 were added to a jar. These components, comprising the oil phase, were well mixed on a set of rolling mixers. The oil phase mixture was placed into a pressure pot with 138 kPa (20 psi) of nitrogen pressure. The pressure forced the oil phase into a piece of plastic tubing where it was metered using a Zenith pump (Model QM, W. H. Nichols Company, Waltham, Mass.) and was fed into the static mixer train at a rate of approximately 13 grams/min. A set of four static mixers (Statomix MC 06-32, ConProTec Inc., Salem, N.H.) with the constricting portion removed were connected in series. At the 3 junctions of the individual static mixers, water was added with pumps (Model RP G-150, FMI Fluid Metering, Inc., Oyster Bay, N.Y.). The FMI pump at the first addition point (closest to the monomer addition) delivered approximately 57 grams/min, the second FMI pump delivered approximately 29 grams/min, and the third FMI pump delivered approximately 15 grams/min. A white emulsion exited the static mixer train, and was polymerized (as described in Example 1). The foam was dried overnight in a forced-air oven at 70° C. The density measured by the water uptake method for this sample was 0.1 g/cc. SEM images of the cross-section of this foam sample are included in FIG. 7.

Example 27

Example 27 involves the production of a foam containing a urethane acrylate, and displaying a unique interconnected cell structure unlike that of the foams demonstrated in the other examples. The oil phase was comprised of 22.83 grams of an aromatic polyester-based urethane diacrylate (CN 973 J75 monomer, Sartomer Co.), 4.00 grams of sorbitan monooleate, 3.23 grams of trimethylolpropane triacrylate, and 0.99 grams of DAROCUR 4265. These components were well mixed on the Jiffy Stir mixer in a plastic beaker prior to water addition. The emulsion was made by adding deionized water at a rate of 20 grams/minute to the oil phase during continuous agitation with the Jiffy Stir mixer at an agitation rate of 520 rpm. After approximately 100 grams of water had been added to the sample, the presence of one viscous white emulsion phase and one separate unemulsified water phase was evident. The agitation rate of the mixer was increased to 830 rpm for several minutes in an attempt to increase the water uptake into the emulsion. At the end of that time, the unemulsified water was decanted from the sample, and the emulsion was polymerized as described in Example 1. The polymerized foam was dried in a forced-air oven overnight at 70° C.

Figure 8:
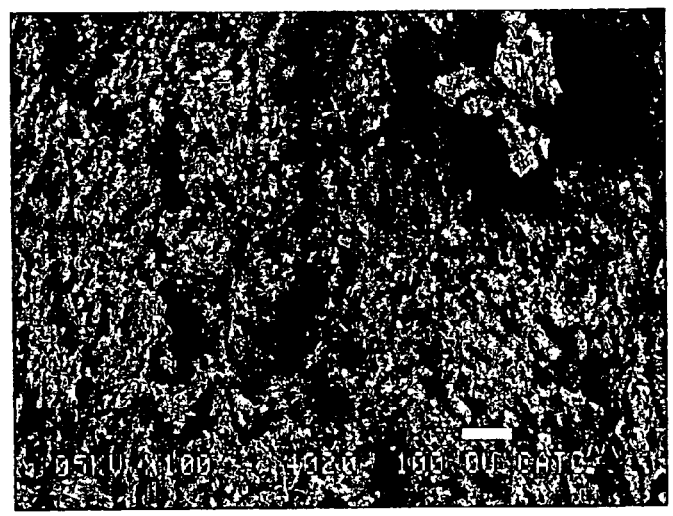
FIG. 8 shows SEM digital image micrographs of a cross section of a foam of the present invention having an inter-connecting channel structure. Magnifications of the foam, from top to bottom, respectively, are 100×, 500×, and 1,000×.
Figure 8:
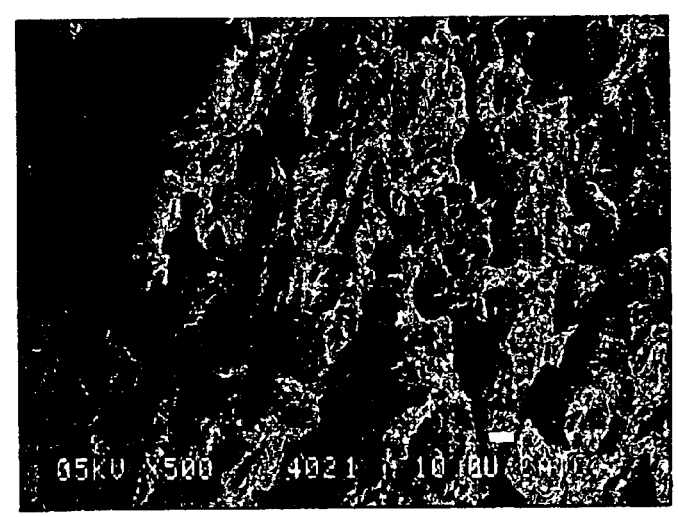
Figure 8:
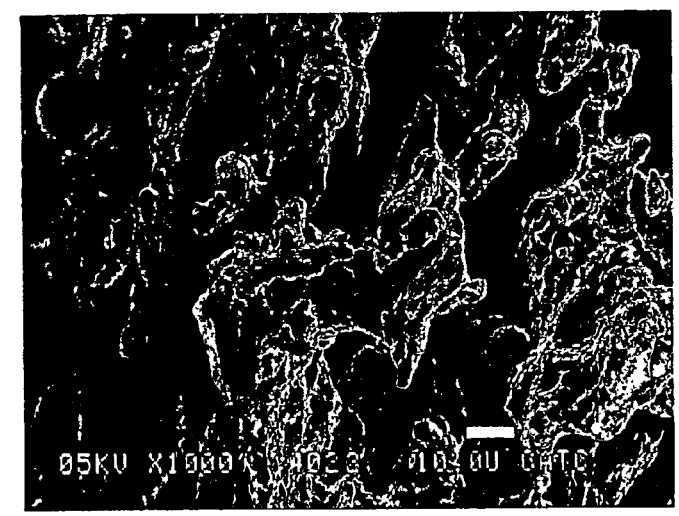

The foam density (measured by water uptake) was approximately 0.27 g/ml. Water absorption by this sample was quite rapid, reaching maximum uptake within 30 seconds. FIG. 8 contains SEM micrographs of the cross-section of the foams described in this Example.

Example 28

Example 28 describes a continuous emulsion-making process using a continuous rotor-stator mixer (UTL-25 mixer, IKA Works, Inc., Wilmington, N.C.). The following oil phase components were mixed on rollers in a closed jar: 43.2 g isobornyl acrylate, 251 g 2-ethylhexyl acrylate, 55.3 g sorbitan monooleate, 43.2 g trimethylolpropane triacrylate, and 27.1 g of DAROCUR 4265. This oil phase mixture was metered into the rotor-stator mixer at approximately 10 grams/min using a Zenith Pump (Model QM, W. H. Nichols Company, Waltham, Mass.). Then water was fed to the rotor-stator mixer at a flowrate of approximately 60 grams/min using a syringe pump. The mixer was operated at 13,500 rpm, and the mixing element used was an inline rotor-stator (Part S25 KV-25-F-IL, IKA Works, Inc., Wilmington, N.C.). The emulsion exiting the mixer was collected in a beaker then polymerized and dried as described in Example 1.

The measured density (by the acrylic coating method) of the dry foam sample was 0.2 grams/cc. The dry foam absorbed 4.73 times its weight in water after approximately 60 seconds of immersion. SEM micrographs of the foam cross-section are shown in FIG. 9.

Example 29

Example 29 describes a continuous emulsion-making process using a pin mixer. The mixing chamber of the pin mixer had an internal diameter of approximately 4 cm and a length of 18 cm. At 90 degree intervals around the circumference of the mixing chamber were mounted pins which extended into the mixing chamber such that they came close to, but did not touch the rotating mixing shaft. The mixing shaft had 10 elements, each element consisted of four appendages extending out at 90 degree angles. The elements were 6 mm wide and separated by approximately 1 cm on the mixing shaft. The clearance between the mixing elements and the wall of the mixing chamber was approximately 0.5–1 mm. The rotation rate of the pin mixer was controlled by a motor and was monitored with a digital readout. The following oil phase components were measured into a jar and mixed by hand: 681.68 g of isobornyl acrylate, 1727.99 g of 2-ethylhexyl acrylate, 426.68 g of sorbitan monooleate, 341.99 g of trimethylolpropane triacrylate, and 111.55 g of DAROCUR 4265. The oil phase mixture was poured into a pressure pot (pressured to approximately 2000 torr with nitrogen). A Zenith pump (described in Example 28), connected to the pressure pot, fed the oil phase mixture to the inlet of the pin mixer. At the same time a pump (Model QDX with a Q1 piston, FMI Fluid Metering, Inc., Oyster Bay, N.Y.) fed deionized water from a bucket into the pin mixer. At the time of collection of the emulsion of Example 29, the monomer flow was approximately 13.8 grams/minute, and the water flow was approximately 118 grams/minute. A valve at the outlet of the pin mixer (which controlled flow and back pressure) was in the completely open position, and the pressure in the pin mixer was 1000 to 5000 torr (20–30 psi) (as measured by a pressure guage on the pin mixer), while the pin mixer rate of agitation was 890 rpm. The emulsion was collected from the outlet of the pin mixer and was polymerized and dried as described in Example 1.

The dry foam resulting from this process had a density (measured by the water uptake method) of 0.10 grams/ml. The foam took up 8.6 times its weight in water after approximately 60 seconds of immersion. SEM micrographs of the dry foam cross-section are contained in FIG. 10. This sample has a similar water to oil ratio as the sample made in Example 26. A comparison of the foam microstructure from Example 26 and Example 29 illustrates the impact of the emulsion-making method on the foam microstructure, and ultimately, on the physical properties of the foam.

Other embodiments of the invention are within the scope of the following claims.

What is claimed is:

1. A process for making a crosslinked polymeric foam comprising:
    a) mixing a reactive phase comprising at least one polymerizable material, at least one crosslinking agent, and at least one emulsifier with at least one photoinitiator and a liquid immiscible with the reactive phase to form an emulsion wherein the immiscible liquid forms a discontinuous or co-continuous phase with the continuous reactive phase;
    b) shaping the emulsion; and
    c) exposing the emulsion to actinic radiation comprising ultraviolet or visible radiation of 200 to 800 nanometers to form a crosslinked polymeric foam containing residual immiscible fluid.

2. The process of claim 1 further comprising removing at least a portion of the residual immiscible liquid from the foam.

3. The process of claim 1 further comprising exposing the crosslinked or crosslinking foam to heat.

4. The process of claim 1 wherein shaping the emulsion comprises forming the emulsion into a particular pattern or shape.

5. The process of claim 1 wherein the polymerizable material comprises an ethylenically- or acetylenically-unsaturated monomer.

6. The process of claim 1 wherein the polymerizable material and crosslinking agent are the same polyfunctional material.

7. The process of claim 1 wherein the polymerizable material is a cationically-curable monomer.

8. The process of claim 1 wherein one polymerizable material and the emulsifier are the same material.

9. The process of claim 1 wherein time is allowed to elapse between steps a) and c).

10. The process of claim 1 wherein the method of mixing the emulsion is selected to produce a targeted microstructure structure in the resulting foam.

11. The process of claim 10 wherein the mixing method comprises using a pin mixer.

12. The process of claim 1 wherein the immiscible liquid is water.

13. The process of claim 1 wherein the immiscible liquid comprises at least 74 volume percent of the emulsion.

14. The process of claim 1 wherein the photoinitiator is in the immiscible phase.

15. The process of claim 1 wherein the photoinitiator is in the reactive phase.

16. The process of claim 1 wherein the reactive phase further comprises materials that can incorporate functional groups into the foam.

17. The process of claim 1 wherein the emulsion is made continuously.

18. The process of claim 1 wherein an open cell foam is produced.

19. The process of claim 1 wherein a closed cell foam is produced.

20. The process of claim 12 wherein the water contains less than 0.1 weight % ionic salt.

21. The process of claim 1 wherein the emulsion is one or both of polymerized and crosslinked using ultraviolet or visible radiation of 300 to 800 nanometers.

22. The process of claim 1 wherein the emulsion is crosslinked after less than 10 minutes exposure to actinic radiation.

23. The process of claim 1 wherein the emulsion is crosslinked after less than 10 seconds exposure to actinic radiation.

24. The process of claim 1 wherein at least one ethylenically unsaturated material is an acrylate.

25. The process of claim 1 wherein the reactive phase further comprises non-polymerizable species.

* * * * *

UNITED STATES PATENT AND TRADEMARK OFFICE
CERTIFICATE OF CORRECTION

PATENT NO. : 6,759,080 B2
DATED : July 6, 2004
INVENTOR(S) : Thunhorst, Kristin L.

It is certified that error appears in the above-identified patent and that said Letters Patent is hereby corrected as shown below:

Column 20,
Line 7, delete "Example 1" and insert -- Example 11 --, therefor.

Column 25,
Line 24, delete "ajar" and insert -- a jar --, therefor.

Signed and Sealed this

Sixteenth Day of November, 2004

JON W. DUDAS
*Director of the United States Patent and Trademark Office*